United States Patent
Damnjanovic et al.

(10) Patent No.: US 12,526,704 B2
(45) Date of Patent: Jan. 13, 2026

(54) USER EQUIPMENT (UE) AUTONOMOUS LAYER 1 (L1) / LAYER 2 (L2) BASED CELL SWITCH UPON BEAM FAILURE DECLARATION (BFD)

(71) Applicant: QUALCOMM Incorporated, San Diego, CA (US)

(72) Inventors: Jelena Damnjanovic, Del Mar, CA (US); Aleksandar Damnjanovic, Del Mar, CA (US); Shanyu Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 18/046,071

(22) Filed: Oct. 12, 2022

(65) Prior Publication Data
US 2024/0129809 A1    Apr. 18, 2024

(51) Int. Cl.
*H04W 36/00* (2009.01)
(52) U.S. Cl.
CPC ... *H04W 36/0061* (2013.01); *H04W 36/0066* (2013.01)
(58) Field of Classification Search
CPC ......... H04W 36/0061; H04W 36/0066; H04W 36/085; H04W 36/0055; H04W 88/04
See application file for complete search history.

(56) References Cited

U.S. PATENT DOCUMENTS

2023/0224740 A1*  7/2023  Yu .................... H04W 24/04
                                                370/252

FOREIGN PATENT DOCUMENTS

EP    4210379 A1    7/2023
WO  2022063144 A1   3/2022

OTHER PUBLICATIONS

Ericsson: "RRC Aspects of L1/L2 Based Inter-cell Mobility", 3GPP TSG-RAN WG2 #119-bis-e, R2-2210333, 3rd Generation Partnership Project, Mobile Competence Centre, 650, Route Des Lucioles, F-06921 Sophia-Antipolis Cedex, FRANCE, vol. Ran WG2, No. Electronic meeting, Oct. 10, 2022-Oct. 19, 2022, Sep. 30, 2022, 7 Pages, XP052263655, Section 2.4.
International Search Report and Written Opinion—PCT/US2023/032555—ISA/EPO—Dec. 20, 2023 (2207985WO).
Qualcomm Incorporated: "Discussion on L1/L2 Mobility", 3GPP TSG-RAN WG2 Meeting #113-bis-e, R2-2103079, 3rd Generation Partnership Project, Mobile Competence Centre, 650, Route Des Lucioles, F-06921 Sophia-Antipolis Cedex, France, vol. Ran WG2, No. Electronic, Apr. 12, 2021-Apr. 20, 2021, Apr. 2, 2021, XP052174591, pp. 1-6, Sections 2.2 and 2.3.

* cited by examiner

*Primary Examiner* — Dady Chery
(74) *Attorney, Agent, or Firm* — Procopio, Cory, Hargreaves & Savitch LLP

(57) ABSTRACT

A method for wireless communication at a user equipment (UE) and related apparatus are provided. In the method, the UE receives a configuration of a set of cells configured for layer 1 (L1) or layer 2 (L2) inter-cell mobility. The UE further transmits a special cell (SpCell) update message in response to an SpCell change condition on the first SpCell in the set of cells for the L1 or L2 inter-cell mobility. The SpCell change condition may include a beam failure on the first SpCell. The method improves the quality of service, beam reliability, and resource utilization of wireless communication, and reduces latency and power consumption of wireless communication.

30 Claims, 18 Drawing Sheets

USER EQUIPMENT (UE) AUTONOMOUS LAYER 1 (L1) / LAYER 2 (L2) BASED CELL SWITCH UPON BEAM FAILURE DECLARATION (BFD)

TECHNICAL FIELD

The present disclosure relates generally to communication systems, and more particularly, to wireless communication with layer 1 (L1) or layer 2 (L2) (L1/L2) based cell switch.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In one aspect of the disclosure, a method, a computer-readable medium, and an apparatus are provided for wireless communication at a first user equipment (UE). The apparatus may include memory; and at least one processor coupled to the memory and configured to receive a configuration of a set of cells configured for layer 1 (L1) or layer 2 (L2) inter-cell mobility; and transmit a special cell (SpCell) update message in response to an SpCell change condition on a first SpCell in the set of cells for the L1 or L2 inter-cell mobility.

In another aspect of the disclosure, a method, a computer-readable medium, and an apparatus are provided for wireless communication at a second UE. The apparatus may include memory; and at least one processor coupled to the memory and configured to receive, from the first UE, the SpCell update message for the first UE; and transmit the SpCell update message to a network.

In yet another aspect of the disclosure, a method, a computer-readable medium, and an apparatus are provided for wireless communication at a network entity. The apparatus may include memory; and at least one processor coupled to the memory and configured to configure, for the first UE, a set of cells for L1 or L2 inter-cell mobility; and receive an SpCell update message for the first UE based on an SpCell change condition with a first SpCell.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
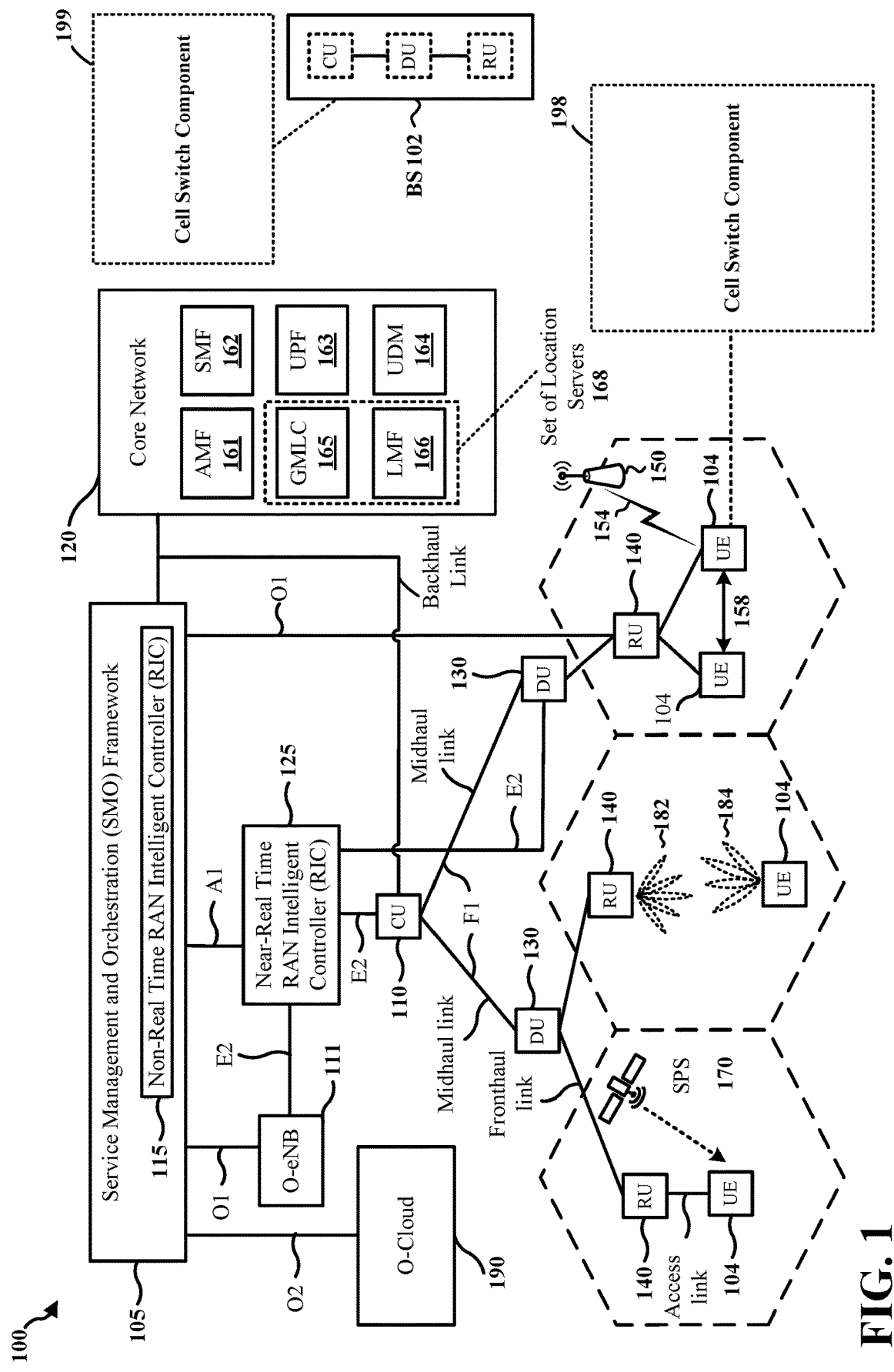
FIG. 1 is a diagram illustrating an example of a wireless communication system and an access network.

A UE may receive a configuration of cells that may be activated for L1 or L2 inter-cell mobility. From the cells configured for L1/L2 inter-cell mobility, the UE may receive control signaling activating one or more cells. Mobility within the configured set of cells may be performed through L1/L2 signaling that allows a quicker activation and deactivation of particular cells in the configured set of cells, e.g., than L3 signaling. Aspects presented herein include methods and apparatus for UE autonomous L1 or L2 based cell switch upon beam failure declaration. As presented herein, in one aspect, a user equipment may receive a configuration of a set of cells configured for L1 or L2 inter-cell mobility; and transmit an SpCell update message in response to an SpCell change condition on a first SpCell in the set of cells for the L1 or L2 inter-cell mobility. The methods improve the quality of service, beam reliability, and resource utilization of wireless communication, and reduce latency and power consumption of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer-executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a cell switch component 198. The cell switch component 198 may be configured to receive a configuration of a set of cells configured for L1 or L2 inter-cell mobility; and transmit an SpCell update message in response to an SpCell change condition on a first SpCell in the set of cells for the L1 or L2 inter-cell mobility. In certain aspects, the base station 102 may include a cell switch component 199. The cell switch component 199 may be configured to configure, for the first UE, a set of cells for L1 or L2 inter-cell mobility; and receive an SpCell update message for the first UE based on an SpCell change condition with a first SpCell. Although the following description may be focused on 5G NR, the concepts described herein may be applicable to other similar areas, such as LTE, LTE-A, CDMA, GSM, and other wireless technologies.

Figure 2:
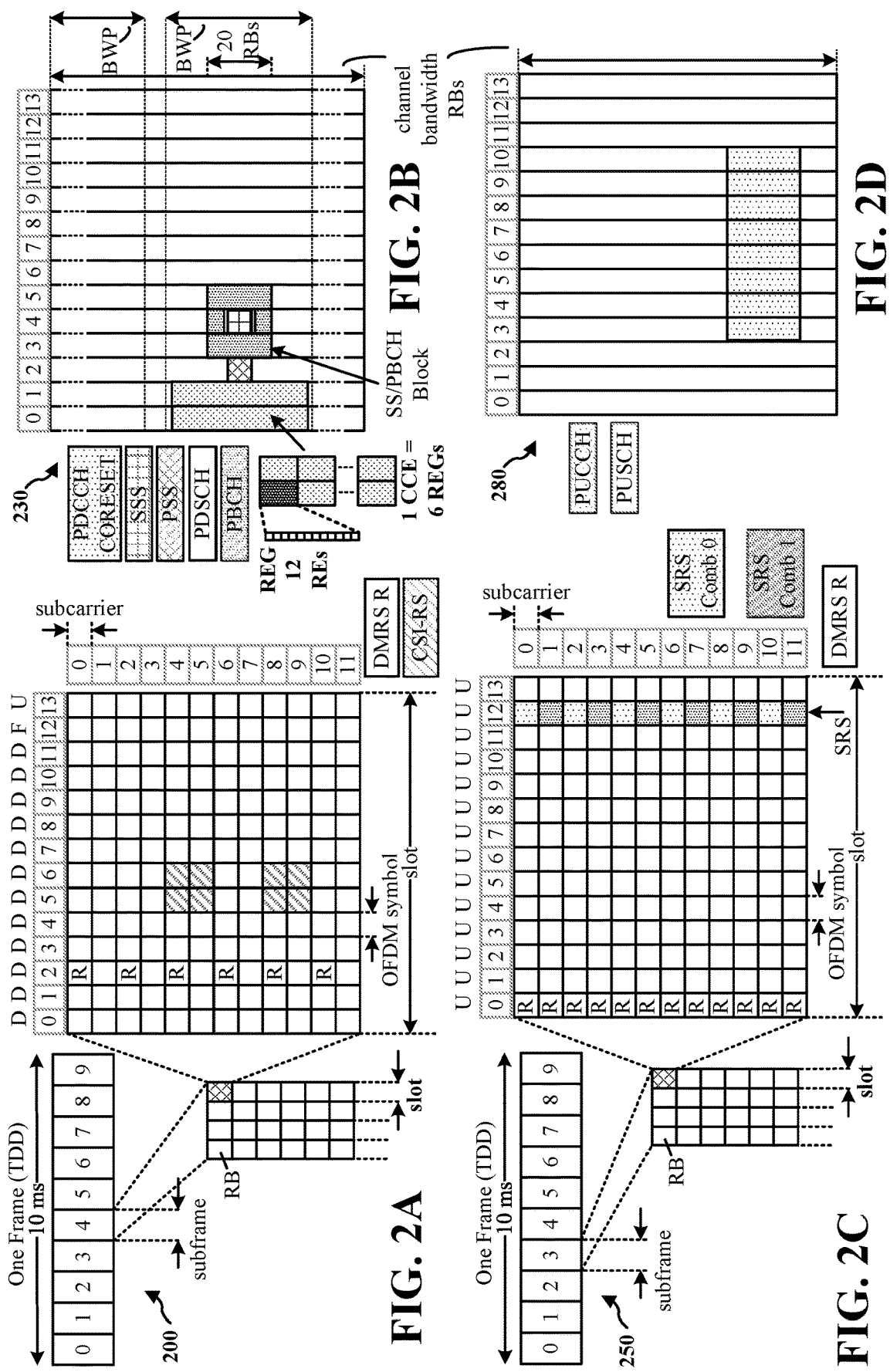
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe.

The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
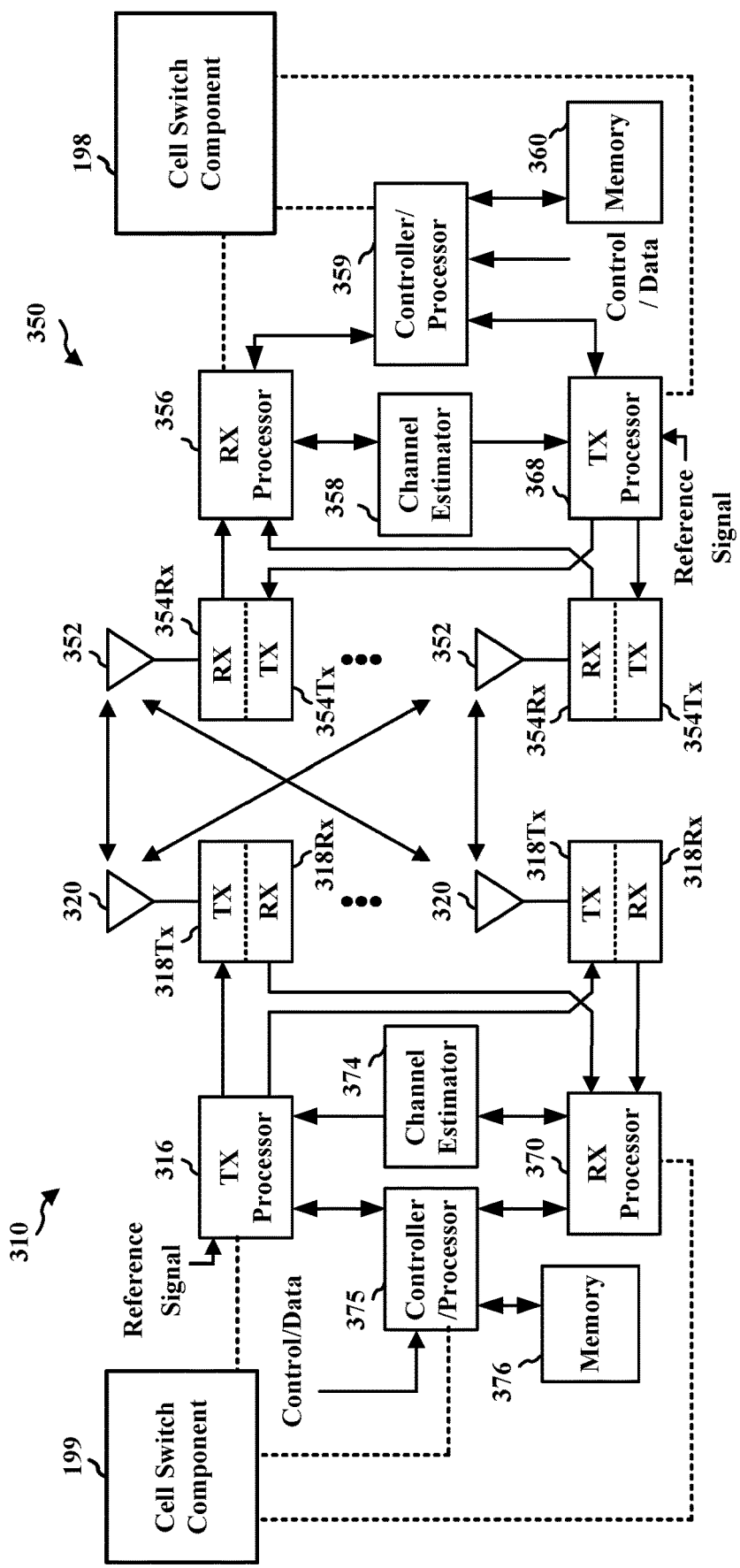
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the cell switch component 198 of FIG. 1.

At least one of the TX processor 316, the RX processor 370, and the controller/processor 375 may be configured to perform aspects in connection with the cell switch component 199 of FIG. 1.

Figure 4:
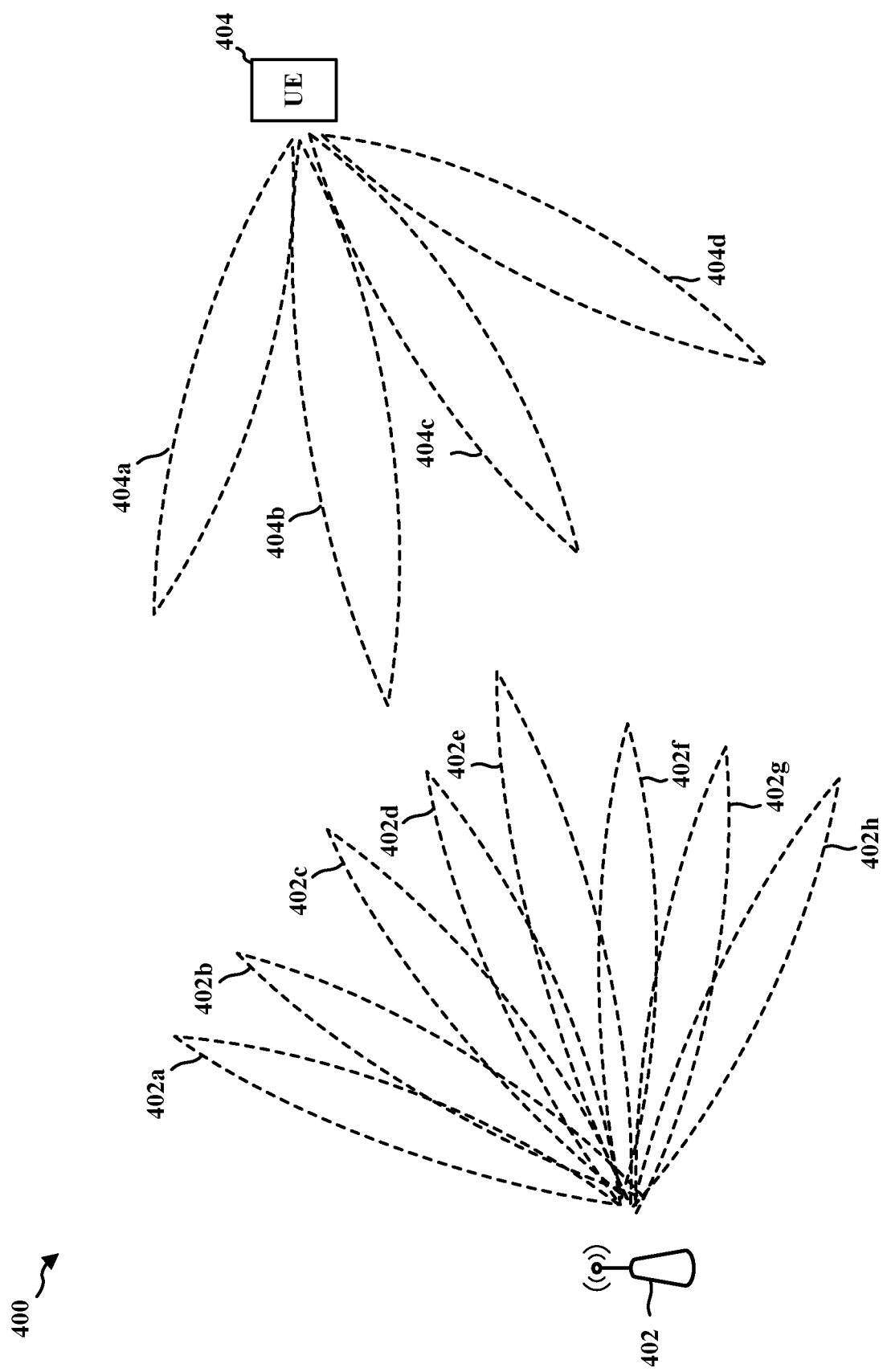
FIG. 4 is a diagram illustrating example transmitting beams and receiving beams in wireless communication.

As described in connection with example 400 in FIG. 4, the base station 402 and UE 404 may communicate over active data/control beams both for DL communication and UL communication. The base station and/or UE may switch to a new beam direction using beam failure recovery procedures. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, the UE 404 may determine to switch beams, e.g., between beams in one or more of the directions 402a-402h. The beam at the UE 404 may be used for reception of downlink communication and/or transmission of uplink communication. In some examples, the base station 402 may send a transmission that triggers a beam switch by the UE 404. For example, the base station 402 may indicate a transmission configuration indication (TCI) state change, and in response, the UE 404 may switch to a new beam for the new TCI state of the base station 402. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. In another aspect, a spatial relation change, such as a spatial relation update, may trigger the UE to switch beams. Switching beams may allow for enhanced or improved connection between the UE and the base station by ensuring that the transmitter and receiver use the same configured set of beams for communication. In some aspects, a single MAC-CE command may be sent by the base station to trigger the changing of the TCI state on multiple CCs.

A UE may monitor the quality of the beams used for communication with a base station. For example, a UE may monitor the quality of a signal received via reception beam(s). A beam failure detection (BFD) procedure may be used to identify problems in beam quality and a beam recovery procedure (BFR) may be used when a beam failure is detected. The BFD procedure may indicate whether a link for a particular beam is in-sync or out-of-sync, which may be referred to as a beam failure instance. For monitoring active link performances, a UE may perform measurements of at least one signal, e.g., reference signals (RS), for beam failure detection. The RS for BFD may be also referred to as beam failure detection reference signal (BFD-RS). The measurements may include deriving a metric similar to a signal to noise and interference ratio (SINR) for the signal, or RSRP strength or block error rate (BLER) of a reference control channel chosen by the base station and/or implicitly derived by UE based on the existing RRC configuration. The BFD-RS may include any of CSI-RS, a synchronization signal block (SSB), or other RS for time and/or frequency tracking, or the like. The UE may receive an indication of reference signal resources to be used to measure beam quality in connection with BFD. The UE may monitor the reference signal(s) and determine the signal quality, e.g., reference signal received power (RSRP) for the reference signal. In some cases, the UE may determine a configured metric such as block error rate (BLER) for a reference signal. The measurement(s) may indicate the UE's ability to decode a transmission, e.g., a DL control transmission from the base station.

Thresholds may be defined in tracking the radio link conditions, the threshold(s) may correspond to an RSRP, a BLER, etc. that indicates an in-sync condition and/or an out-of-sync condition of the radio link. An "out-of-sync" condition may indicate that the radio link condition is poor, and an "in-sync" condition may indicate that the radio link condition is acceptable, and the UE is likely to receive a transmission transmitted on the radio link. An Out-of-Sync condition may be declared when a block error rate for the radio link falls below a threshold over a specified time interval, e.g., a 200 ms time interval. The Out-of-Sync condition may also be referred to as a beam failure instance (BFI). The UE may determine a BFI indicator at every occasion of BFD-RS. An in-sync condition may be declared when a block error rate for the radio link is better than a threshold over a second, specified time interval, e.g., over 100 ms time interval.

The thresholds and time intervals used to determine the in-sync condition and out-of-sync condition may be the same or may be different from each other. With each BFI, the UE (e.g., a MAC entity at the UE) may increase a BFI count by 1. If the UE receives a threshold number of consecutive out-of-sync measurements (e.g., if a total BFI count reaches a maximum count threshold before a BFD timer expires), which may be referred to as beam failure instances (BFIs) over a period of time, the UE may identify a beam failure detection (BFD) and may declare a beam failure to the network and accordingly initiate a beam failure recovery (BFR) procedure. For example, the UE may declare a beam failure and initiate a BFR procedure. If the BFD timer expires before the BFI count reaches the threshold, the UE does not declare a beam failure, the total BFI count is reset to 0, and the BFD timer is reset. The BFR procedure may include notifying the network about the beam failure and accordingly initiating a beam switching procedure via medium access control (MAC) control element (MAC-CE) or downlink control information (DCI) or beam recovery procedure via random access channel (RACH). In some aspects, a subset of the beams may be monitored by the UE. As an example, the UE 404 may monitor beams in directions 402d, 402e, and 402f, and the UE 404 might not monitor beams in directions 402a-c and 402g-h.

Figure 5:
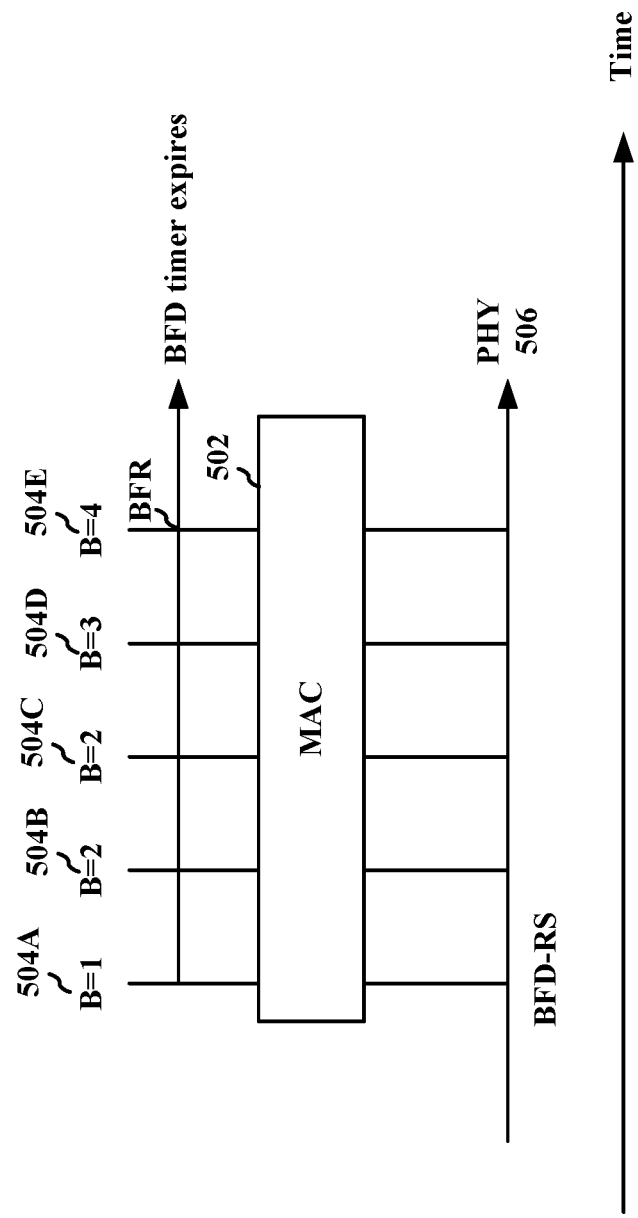
FIG. 5 is a diagram illustrating example aspects of a beam failure detection (BFD) and beam failure recovery (BFR) procedure.

FIG. 5 is a diagram 500 illustrating example aspects of a BFD and BFR procedure. A medium access control (MAC) entity 502 at a UE may receive BFD-RS from a physical (PHY) entity 506 at the UE. The BFD-RS may be transmitted from the network and received by the PHY entity 506 at the UE. Upon receiving a first BFD-RS 504A, the UE may identify whether BFI occurs based on the various measurements previously described. Upon identifying an occurrence of a BFI upon receiving the first BFD-RS 504A, the UE may initiate a BFD timer with a defined duration. The UE may keep identifying additional BFIs based on received BFD-RS 504B, 504C, 504D, and 504E. Over the period of time until the BFD timer with the defined duration expires, if a total BFI count reaches a threshold (e.g., a maxCount threshold), the UE may declare a beam failure and may accordingly initiate a BFR procedure. In the example illustrated in FIG. 5, the threshold may be 4. If the BFD timer expires before the total BFI count reaches the threshold, the UE may not declare beam failure and may reset BFI counts to zero and reset the BFD timer.

Figure 6:
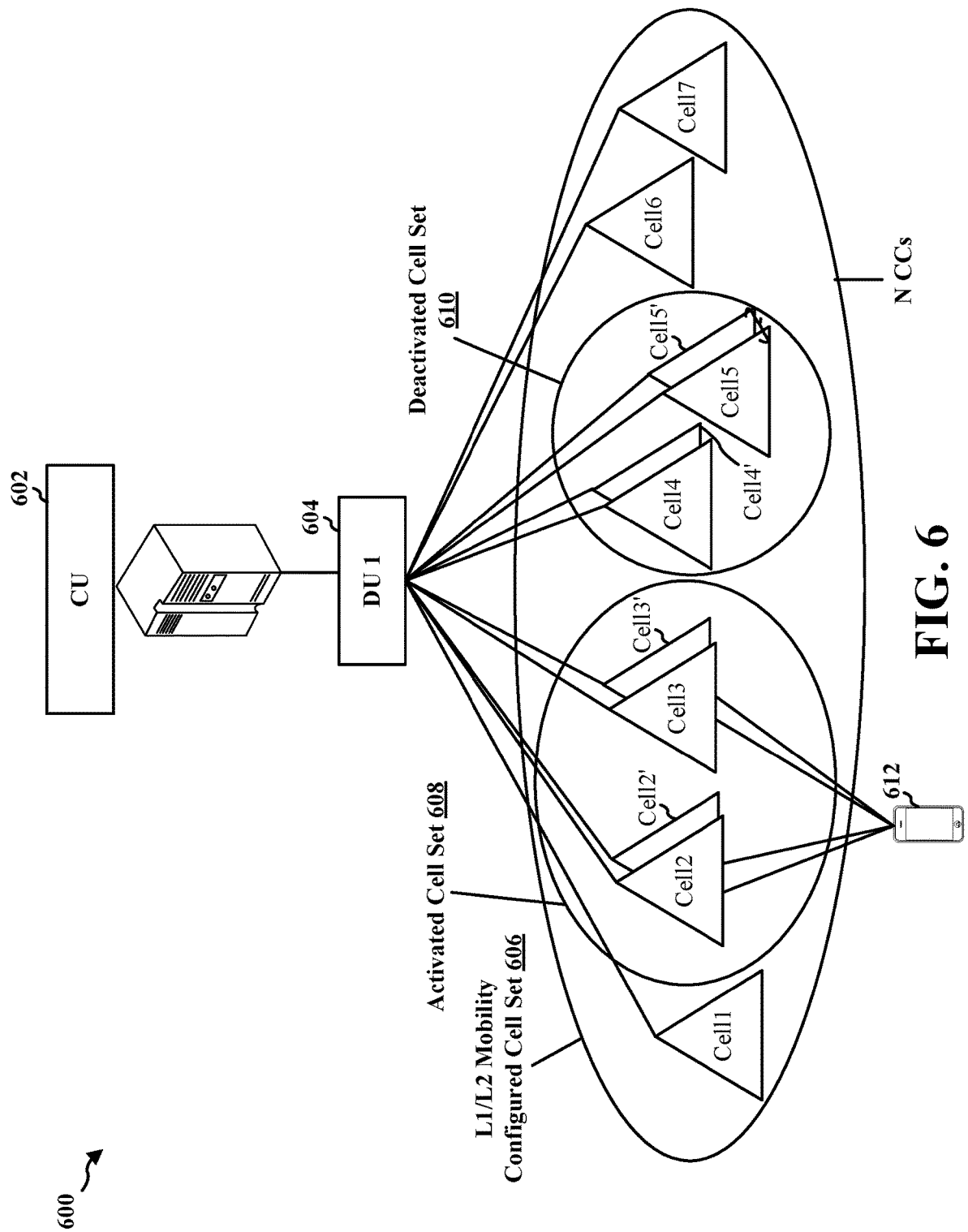
FIG. 6 is a diagram illustrating an example cell configuration in wireless communication.

FIG. 6 is a diagram 600 illustrating example cell configuration. As illustrated in FIG. 6, a CU 602 (which may correspond to a component of a base station such as a gNB) may be associated with a first DU 604 (and other DUs). An L1/L2 mobility configured cell set 606 may be associated with the first DU 604 and may include an L1/L2 mobility activated cell set 608 and an L1/L2 mobility deactivated cell set 610. The L1/L2 mobility configured cell set 606 may also include one or more cells not in the current L1/L2 mobility activated cell set 608 or the current L1/L2 mobility deactivated cell set 610. For example, at a given time, the L1/L2 mobility activated cell set 608 may include a first subset of the L1/L2 mobility configured cell set, and the L1/L2 mobility deactivated cell set 610 may include a second, non-overlapping subset of the L1/L2 mobility configured cell set. There may remain one or more cells that are in the L1/L2 mobility configured cell set that are not in the first set subset (e.g., activated) or the second subset (e.g., deactivated). A UE 612 may use the cells in the L1/L2 mobility activated cell set 608 for data channel and control channel communications.

A UE may be provided with a subset of L1/L2 mobility deactivated cells (candidate cell set) that the UE may autonomously choose to add to the L1/L2 mobility activated cell set. For example, the UE may add cells in the subset of L1/L2 mobility deactivated cells to the L1/L2 mobility activated cell set based on measurements (e.g., measured channel quality), loading, or the like. In some aspects, each of the RUs could have multi-component carrier (CC) (N CCs) support (where each CC is a cell). In some aspects, activation or deactivation may be performed for groups of carriers (cells). For PCell management, L1/L2 signaling may be used to set the PCell out of the configured options within the activated cell set. In some aspects, L3 mobility may be used for PCell change (L3 handover) when a new PCell is not from the activated cell set for L1/L2 mobility. As an example, RRC signaling may be used to update the set of cells for L1/L2 mobility at L3 handover. Example aspects may enable L1/L2 based inter-cell mobility that may co-exist with CA. Example aspects may provide configuration, cell activation or deactivation, and associated with signaling to enable L1/L2 mobility with CA to facilitate more efficient and robust mobility management. In some aspects, L1/L2 mobility configured cells may be associated with a PCell configuration without being the PCell. The PCell configuration may be activated and one of the L1/L2 mobility activated cells (e.g., in an L1/L2 mobility activated cell set) may be activated based on L1/L2 signaling to become a PCell. In some aspects, L1/L2 mobility deactivated cells (e.g., in an L1/L2 mobility deactivated cell set) may support L1 measurements to facilitate sufficient beam management, timing synchronization, power control, or the like. For L1/L2 mobility deactivated cells, measurement reporting may be done on an activated cell.

A network node (e.g., a base station or one or more components of a base station) may change a special cell (SpCell) for a UE using a layer 3 (L3) handover (e.g., using radio resource control (RRC) signaling). However, L3 handovers may be time-consuming and/or inefficient. Aspects presented herein provide a more rapid change for one or more cells, including SpCell and SCell, without the degradation in service quality. A network node that utilizes the improved L1/L2 signaling scheme is able to change one or more cells for a UE in a more rapid manner in comparison to L3 (RRC) based approaches. In an example, a UE receives an L1 or L2 mobility cell configuration for a set of cells for L1 or L2 inter-cell mobility. The set of cells may include multiple cells, and each cell in the set of cells is able to be activated or deactivated for data and/or control transfer using L1 or L2 signaling. The UE receives L1 or L2 signaling indicating multiple activated cells, and activates one or more cells in the multiple activated cells in the priority order for the data and/or control transfer using L1 or L2 signaling. Via the aforementioned L1 or L2 signaling, one or more cells, including SpCell and SCell, are able to be activated and/or deactivated in a manner that avoids RRC-based signaling. As a result, the cells may be activated and/or deactivated in a more rapid manner in comparison to RRC-based signaling. Additionally, the cells may be activated in a priority order to further facilitate more efficient and robust mobility management.

A base station may configure a UE, e.g., in RRC signaling, with a set of cells for L1/L2 mobility. The set of cells may be referred to as an L1/L2 mobility configured set. A subset of the cells in the configured set may be activated and can be used for data and control transfer between the UE and the network. The subset of activated cells may be referred to as the L1/L2 mobility activated cell set. A subset of the L1/L2 mobility configured set may be deactivated and may be referred to as the L1/L2 mobility deactivated set. The L1/L2 deactivated set of cells can be activated for the UE by L1/L2 signaling from the network. Aspects presented herein provide for group level mobility management of the activated set, e.g., providing L1/L2 signaling that may be used to activate/deactivate cell groups within the L1/L2 mobility configured set of cells and/or to select beams within the activated cells. The group level mobility management may provide seamless mobility within the activated cell groups within the set.

The present disclosure presents methods and apparatus for L1/L2 based cell switch upon beam failure declaration.

Figure 7:
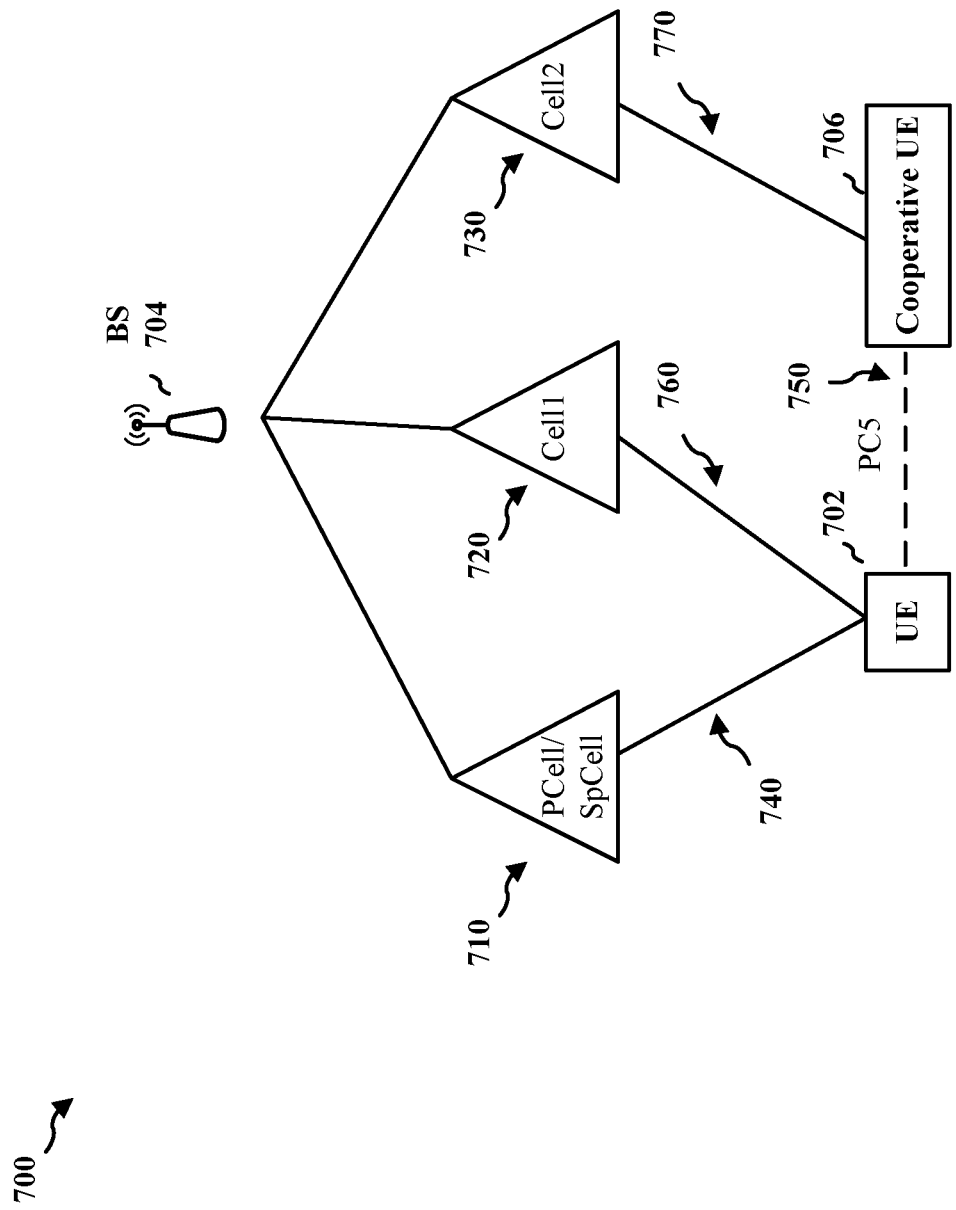
FIG. 7 is a diagram illustrating L1 or L2 based cell configuration in accordance with various aspects of the present disclosure.

FIG. 7 is a diagram 700 illustrating L1/L2 based cell configuration in accordance with various aspects of the present disclosure. As shown in FIG. 7, a UE 702 may be configured by the base station 704 with multiple candidate cells for L1/L2 inter-cell mobility. The UE 702 may be connected to the base station 704 on a Uu link 740 and to a cooperative UE 706 on sidelink 750 through, for example, PC5 interface (a multi-path connectivity scenario). The cooperative UE 706 may be connected to the same base station 704 (e.g., through cell 730) as the UE 702 connects to. The UE 702 and the base station 704 may communicate with each other through both the Uu link 740 and the relay link via the cooperative UE 706.

Referring to FIG. 7, in some aspects, when the UE 702 declares beam failure, or another type of SpCell change condition, for the connection with the current PCell/SpCell 710, the UE may perform the cell switch through a cooperative UE upon the beam failure declaration.

In one configuration, the UE 702 may perform an autonomous cell switch through a cooperative UE 706 upon beam failure declaration, among other examples that may trigger the UE to indicate or request an SpCell change. As shown in FIG. 7, if the UE 702 declares beam failures on the current Uu link 740, the UE 702 may autonomously switch to the new cell (e.g., Celli 720) and utilize the cooperative UE 706 to notify the base station 704. The autonomous cell switch may avoid the RACH procedure to be connected to the base station 704 through the new cell (e.g., 720), and utilize the available sidelink for a potentially more reliable transmission (similar to SCell BFR operation). The UE 702 may send a cell switch report to the base station 704. The cell switch report may include an indication of beam failure detected on the Uu link 740 with the current PCell/SpCell 710. The cell switch report may further include the old Uu link channel condition measurement history and the indication of the new PCell (e.g., Celli 720) that the UE 702 will use. The UE 702 may indicate preferred beam information associated with the new cell (e.g., Celli 720). The cell switch report may be signaled through MAC-CE or UCI. In one configuration, these signaling may be relayed via the cooperative UE 706 on the sidelink. In some aspects, the cell switch report may indicate that the UE intends to change to a new SpCell. In some aspects, the cell switch report may correspond to a request to change to the new SpCell.

In another configuration, the UE 702 may request SpCell switch through relay via a cooperative UE upon beam failure declaration. As shown in FIG. 7, if the UE 702 declares beam failures on the current Uu link 740, the UE 702 may request to switch to a new cell (e.g., Celli 720) and utilize the cooperative UE 706 to notify the base station 704. The request for the SpCell switch may avoid the RACH procedure to be connected to the base station 704 through the new cell (e.g., 720), and utilize the available sidelink for potentially more reliable transmission (similar to SCell BFR operation). The UE 702 may send an SpCell switch request to the base station 704. The content of the SpCell switch request may include an indication of beam failure detected on the Uu link 740 with the current PCell/SpCell 710. The SpCell switch request may further include the old Uu link channel condition measurement history and the indication of the SpCell switch, which may indicate one or more of: the preferred new SpCell and the preferred beam information associated with the new SpCell. The SpCell switch request may be signaled through MAC-CE or UCI. In one configuration, these signaling may be relayed via the cooperative UE 706 on the sidelink.

Figure 8:
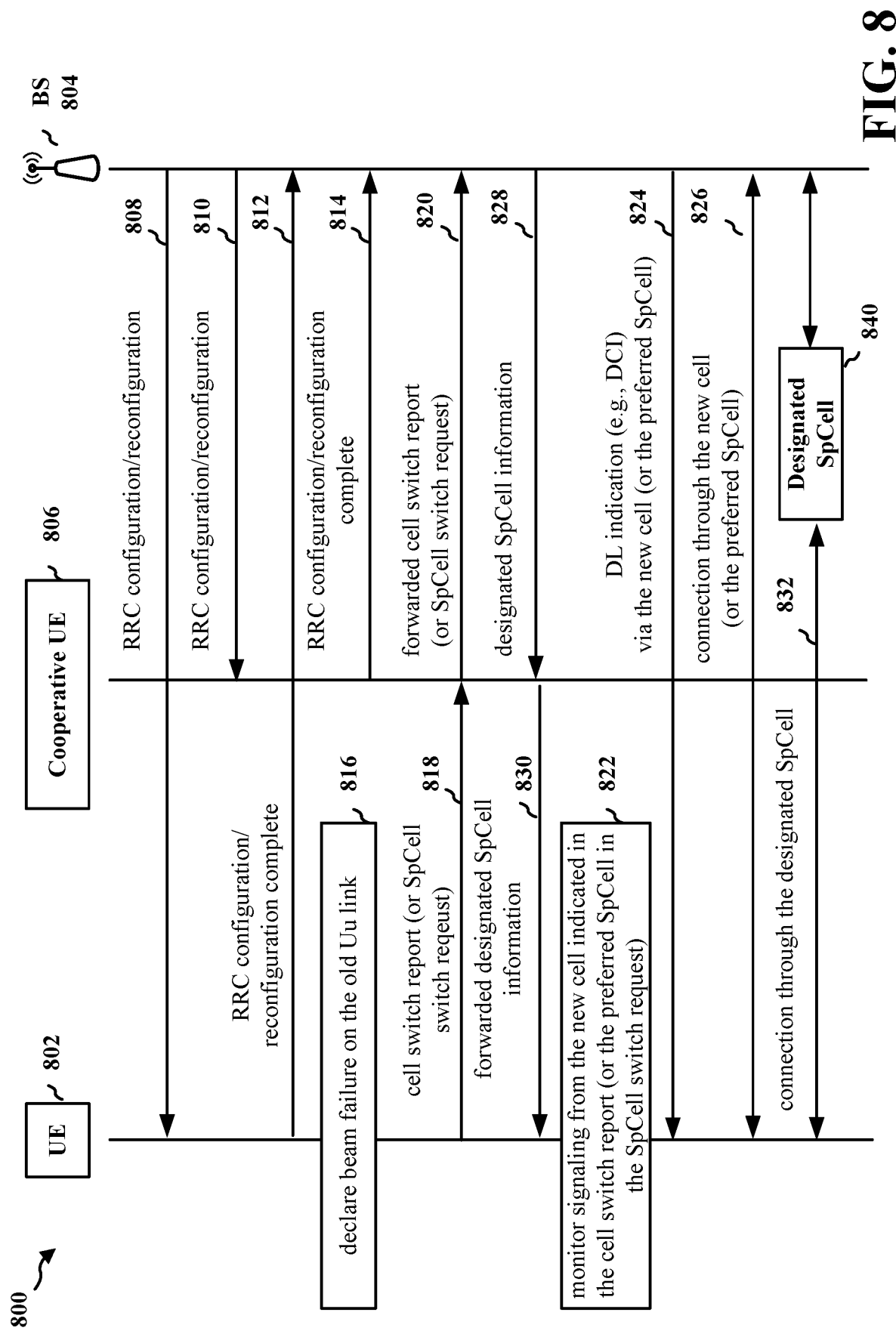
FIG. 8 is a call flow diagram illustrating a cell switch via a cooperative UE in accordance with various aspects of the present disclosure.

FIG. 8 is a call flow diagram 800 illustrating a cell switch via a cooperative UE in accordance with various aspects of this present disclosure. Although aspects are described for a base station 804, the aspects may be performed by a base station in aggregation and/or by one or more components of a base station 804 (e.g., such as a CU 110, a DU 130, and/or an RU 140).

As shown in FIG. 8, the first several steps of the cell switch via a cooperative UE may be related to RRC configuration signaling and acknowledgement between the UE 802, the cooperative UE 806, and the base station 804 to be ready to provide such cooperative cell switch messages. These steps may include, for example, the base station 804 transmitting RRC configuration (or reconfiguration) to the UE 802 (at 808) and the cooperative UE 806 (at 810), respectively, and receiving the confirmation of RRC configuration (or reconfiguration) complete from the UE 802 (at 812) and the cooperative UE 806 (at 814), respectively. The RRC configuration (or reconfiguration) may include configuration (or reconfiguration) for one or more of: sidelink resources, L1/L2 mobility cell set, SpCell switch/update options, and cell switch report options.

As shown in FIG. 8, in one configuration, when the UE 802 declares, at 816, beam failure on the old Uu link (e.g., Uu link 740), the UE 802 may send a cell switch report to the base station 804 via the cooperative UE 806. That is, the UE 802 may first send, at 818, the cell switch report to the cooperative UE 806, and the cooperative UE 806 may forward, at 820, the received cell switch report to the base station 804. The cell switch report may indicate a new cell the UE 802 will switch to for communication with the base station 804. The sidelink resources for the transmission between the UE 802 and the cooperative UE 806 may be preconfigured by the base station 804. The cooperative UE 806 may provide ACK to the UE 802 regarding the cell switch report relaying status (e.g., an ACK indicating the cell switch report has been received by the cooperative UE 806 or the cell switch report has been relayed to the base station 804). After sending the cell switch report, the UE 802 may start monitoring, at 822, signaling from the new cell as indicated in the cell switch report. The cell switch may be considered successful when the UE 802 receives, at 824, a DL indication (e.g., DCI) via the new cell. Once the cell switch is completed, the UE 802 may, at 826, communicate with the base station 804 through the new cell.

As shown in FIG. 8, in another configuration, when the UE 802 declares, at 816, beam failure on the old Uu link (e.g., Uu link 740), the UE 802 may send an SpCell switch request to the base station 804 via the cooperative UE 806. That is, the UE 802 may first send, at 818, an SpCell switch request to the cooperative UE 806, and the cooperative UE 806 may forward, at 820, the received SpCell switch request to the base station 804. The sidelink resources for the transmission between the UE 802 and the cooperative UE 806 may be preconfigured by the base station 804. The cooperative UE 806 may provide ACK to the UE 802 regarding the SpCell switch request relaying status (e.g., an ACK indicating the SpCell switch request has been received by the cooperative UE 806 or the SpCell switch request has been relayed to the base station 804). After sending the SpCell switch request, the UE 802 may start monitoring, at 822, signaling from the preferred SpCell as indicated in the SpCell switch request. The cell switch may be considered successful when the UE 802 receives, at 824, a DL indication (e.g., DCI) via the preferred SpCell. Once the cell switch is completed, the UE 802 may, at 826, communicate with the base station 804 through the preferred SpCell.

In some aspects, referring to FIG. 8, the base station 804 may respond to the SpCell switch request with a designated SpCell 840 for the UE 802. In one configuration, if the UE 802 does not indicate a preferred new SpCell information in the SpCell switch request, the base station 804 may respond with a designated SpCell 840. In another configuration, if the UE 802 indicates preferred new SpCell information in the SpCell switch request, the base station 804 may respond with a designated SpCell 840 that may be the same as or different from the preferred SpCell indicated in the SpCell switch request. The designated SpCell may be determined based on factors such as the quality of service (QoS) requirement of serving traffic, and the power/capacity/capability constraint of the source and relay UE. If the base station 804 responds with a designated SpCell 840, the base station 804 may indicate a cell ID for the designated SpCell and the SpCell configuration to use if multiple configurations are available. The response of the base station 804 may be sent via MAC-CE or DCI, and the cooperative UE 806 may forward the base station's response to the UE 802. That is, the base station 804 may send, at 828, the response that includes the designated SpCell information to the cooperative UE 806, and the cooperative UE 806 may forward, at 830, the designated SpCell information to the UE 802. After a preconfigured time, the UE 802 and the base station 804 may connect over the designated SpCell 840.

For DL-based cell activation/deactivation, the base station may send the activation/deactivation signal to the UE via MAC-CE or DCI. For UL-based cell activation/deactivation, the UE may send the activation/deactivation request to the base station via MC-CE or UCI, and the UE may wait for the base station's response for approval or denial. The cell activation/deactivation determining factors may include, but are not limited to, the quality of service (QoS) requirement of serving traffic, and the power/capacity/capability constraint of the source and relay UE.

Referring to FIG. 7, in some aspects, when the UE 702 declares beam failure on the connection with the current PCell/SpCell 710, the UE may perform the cell switch through a new cell upon the beam failure declaration.

In one configuration, if the UE 702 declares beam failure on the current Uu link 740, the UE 702 may autonomously switch to new cell 720 and send the BFR to the new cell 720. The prerequisites for the autonomous cell switch through a new cell are the UE 702 is configured with new cell access information and is synchronized to the new cell 720 before the cell switch report is sent to the new cell (the timing advance (TA) to the new cell is known). As shown in FIG. 7, if the UE 702 declares beam failures on the current Uu link 740, the UE 702 may autonomously switch to the new cell 720 and notify the base station 704 through the new cell 720. The UE 702 may send a cell switch report to the base station 704 via the new cell 720. The cell switch report may include an indication of beam failure detected on the Uu link 740 with the current PCell/SpCell 710. The cell switch report may further include old Uu link channel condition measurement history and the indication of the new PCell (e.g., Celli 720) that the UE 702 will use. The UE 702 may indicate preferred beam information associated with the new cell (e.g., Celli 720). The cell switch report may be signaled through MAC-CE or UCI (if the UL grant to the new cell is available) or a scheduling request (SR).

In another configuration, if the UE 702 declares beam failure on current Uu link 740, the UE 702 may request an SpCell switch through a direct link (e.g., request to update a current active SCell to become the new SpCell through L1/L2 signaling). The prerequisites for requesting SpCell switch through a direct link are the UE 702 is configured with new cell access information and has multiple active cells, and the UE 702 is synchronized to the new cell before the SpCell switch request is sent (e.g., the new cell is a currently active SCell). As shown in FIG. 7, if the UE 702 declares beam failures on the current Uu link 740, the UE 702 may request SpCell switch to a new cell (e.g., Celli 720). The UE 702 may send an SpCell switch request to the base station 704 via the new cell 720. The content of the SpCell switch request may include an indication of beam failure detected on the Uu link 740 with the current PCell/SpCell 710. The SpCell switch request may further include old Uu link channel condition measurement history and the indication of the request to update the current cell (e.g., Celli 720) to become the new SpCell. The SpCell switch request may be signaled through MAC-CE or UCI.

Figure 9:
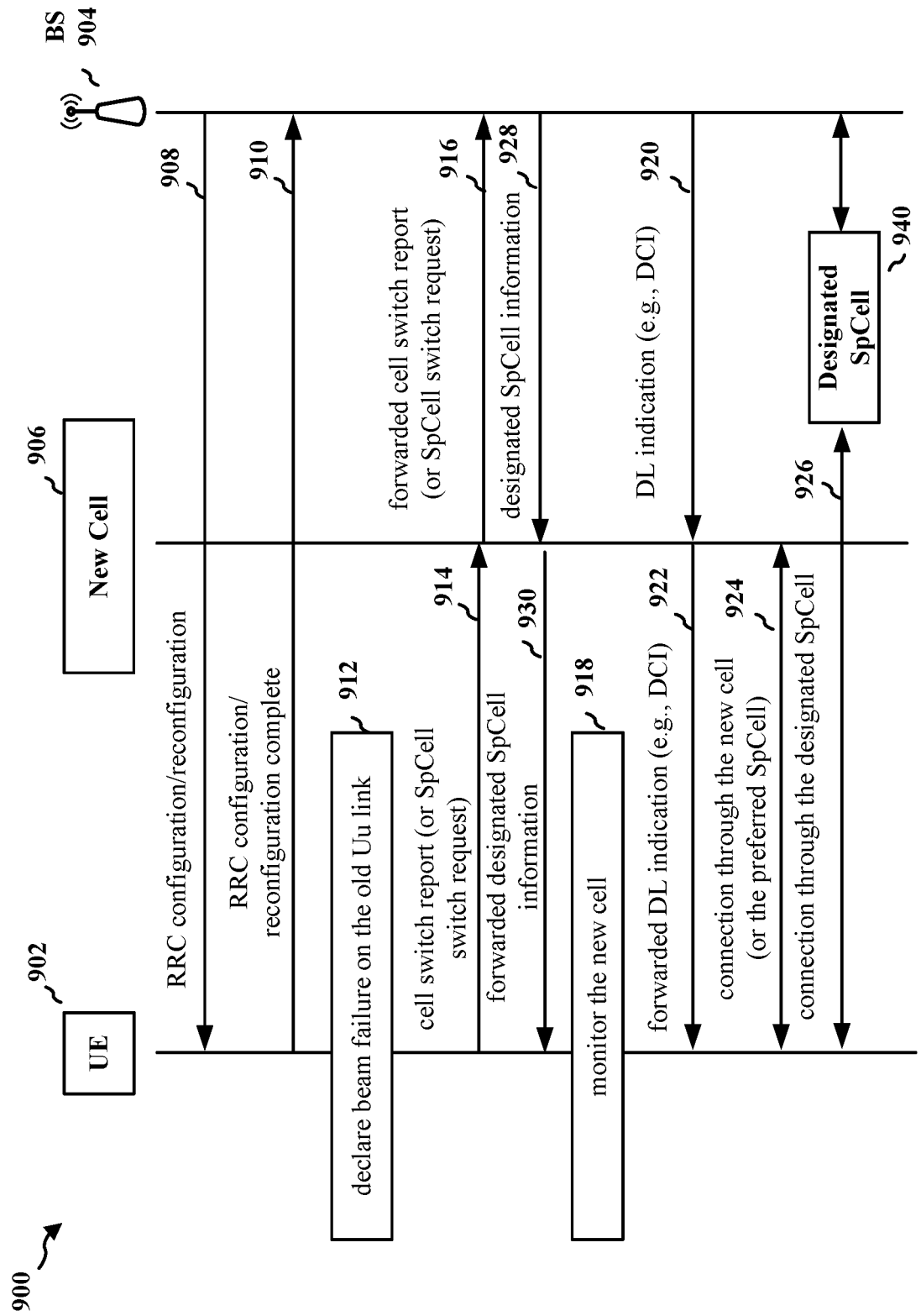
FIG. 9 is a call flow diagram illustrating a cell switch via a new cell in accordance with various aspects of the present disclosure.

FIG. 9 is a call flow diagram 900 illustrating a cell switch via a new cell in accordance with various aspects of this present disclosure. Although aspects are described for a base station 904, the aspects may be performed by a base station in aggregation and/or by one or more components of a base station 904 (e.g., such as a CU 110, a DU 130, and/or an RU 140).

As shown in FIG. 9, the first several steps of the cell switch via a new cell may be related to RRC configuration signaling and acknowledgement between the UE 902 and the base station 904. These steps may include, for example, the base station 904 transmitting RRC configuration (or reconfiguration) to the UE 902 (at 908), and receiving the confirmation of RRC configuration (or reconfiguration) complete from the UE 902 (at 910). The RRC configuration (or reconfiguration) may include configuration (or reconfiguration) for one or more of: L1/L2 mobility cell set, SpCell switch/update options, and cell switch report options.

As shown in FIG. 9, in one configuration, when the UE 902 declares, at 912, beam failure on the old Uu link (e.g., Uu link 740), the UE 902 may send a cell switch report to the base station 904 via the new cell 906. That is, the UE 902 may first send, at 914, the cell switch report to the new cell 906, and the new cell 906 may forward, at 916, the received cell switch report to the base station 904. After sending the cell switch report, the UE 902 may start monitoring, at 918, the new cell 906 as indicated in the cell switch report. The cell switch may be considered successful when the UE 902 receives a DL indication (e.g., DCI) from the base station 904 via the new cell 906 (i.e., the UE 902 receives from the new cell 906, at 922, a forwarded DL indication the new cell 906 receives, at 920, from the base station 904). Once the cell switch is completed, the UE 902 may, at 924, communicate with the base station 904 through the new cell 906.

As shown in FIG. 9, in another configuration, when the UE 902 declares, at 912, beam failure on the old Uu link (e.g., Uu link 740), the UE 902 may send an SpCell switch request to the base station 904 via new cell 906 (a currently active SCell). That is, the UE 902 may first send, at 914, an SpCell switch request to the new cell 906, and the new cell 906 may forward, at 916, the received SpCell switch request to the base station 904. After sending the SpCell switch request, the UE 902 may start monitoring, at 918, the new cell 918. The cell switch may be considered successful when the UE 902 receives a DL indication (e.g., DCI or MAC-CE) from the base station 904 via the new cell 906 (i.e., the UE 902 receives from the new cell 906, at 922, a forwarded DL indication the new cell 906 receives, at 920, from the base station 904). The UE 902 may apply SpCell configuration that is preconfigured by RRC in the new cell 906. If the new cell 906 has multiple SpCell configurations, the base station 904 may further indicate the configuration to use for the new SpCell (new cell 906), coupled in the DCI or MAC CE.

In some aspects, referring to FIG. 9, the base station 904 may respond to the SpCell switch request with a designated SpCell 940 for the UE 902. In one configuration, if the UE 902 does not indicate preferred new SpCell information in the SpCell switch request, the base station 904 may respond with a designated SpCell 940. In another configuration, if the UE 902 indicates preferred new SpCell information in the SpCell switch request, the base station 904 may respond with a designated SpCell 940 that may be the same as or different from the preferred SpCell indicated in the SpCell switch request. The designated SpCell may be determined based on factors such as the quality of service (QoS) requirement of serving traffic, and the power/capacity/capability constraint of the source and relay UE. If the base station 904 responds with a designated SpCell 940, the base station 904 may indicate a cell ID for the designated SpCell and the SpCell configuration to use if multiple configurations are available. The response of the base station 904 may be sent via MAC-CE or DCI, and the new cell 906 may forward the base station's response to the UE 902. That is, the base station 904 may send, at 928, the response that includes the designated SpCell information to the new cell 906, and the new cell 906 may forward, at 930, the designated SpCell information to the UE 902. After a preconfigured time, the UE 902 and the base station 904 may communicate, at 926, over the designated SpCell 940.

For DL-based cell activation/deactivation, the base station may send the activation/deactivation signal to the UE via MAC-CE or DCI. For UL-based cell activation/deactivation, the UE may send the activation/deactivation request to the base station via MC-CE or UCI, and the UE may wait for the base station's response for approval or denial. The cell activation/deactivation determining factors may include, but are not limited to, the quality of service (QoS) requirement of serving traffic, and the power/capacity/capability constraint of the source and relay UE.

Referring to FIG. 7, in some aspects, when the UE 702 declares beam failure on the connection with the current PCell/SpCell 710, the UE may perform the cell switch through a new cell 720 and a cooperative UE 706 upon the beam failure declaration.

In one configuration, the UE 702 may perform an autonomous cell switch through a cooperative UE 706 and a new cell 720 upon beam failure declaration. As shown in FIG. 7, if the UE 702 declares beam failures on the current Uu link 740, the UE 702 may autonomously switch to the new cell (e.g., Celli 720) and utilize the cooperative UE 706 and the new cell 720 to notify the base station 704. The autonomous cell switch may avoid the RACH procedure to be connected to the base station 704 through the new cell (e.g., 720), and utilize the available sidelink for potentially more reliable transmission (similar to SCell BFR operation). The UE 702 may send a cell switch report to the base station 704. The cell switch report may include an indication of beam failure detected on the Uu link 740 with the current PCell/SpCell 710. The cell switch report may further include the old Uu link channel condition measurement history and the indication of the new PCell (e.g., Celli 720) that the UE 702 will use. The UE 702 may indicate preferred beam information associated with the new cell (e.g., Celli 720). The cell switch report may be signaled through MAC-CE or UCI. In one configuration, these signaling may be relayed via the cooperative UE 706 on the sidelink and via the new cell 720.

In another configuration, the UE 702 may request SpCell switch through relay via a cooperative UE and via a new cell upon beam failure declaration. As shown in FIG. 7, if the UE 702 declares beam failures on the current Uu link 740, the UE 702 may request to switch to a new cell (e.g., Celli 720) and utilize the cooperative UE 706 and the new cell 720 to notify the base station 704. The request for the SpCell switch may avoid the RACH procedure to be connected to the base station 704 through the new cell (e.g., 720), and utilize the available sidelink for potentially more reliable transmission (similar to SCell BFR operation). The UE 702 may send an SpCell switch request to the base station 704. The content of the SpCell switch request may include an indication of beam failure detected on the Uu link 740 with the current PCell/SpCell 710. The SpCell switch request may further include the old Uu link channel condition measurement history and the indication of the SpCell switch, which may indicate one or more of: the preferred new SpCell and the preferred beam information associated with the new SpCell. The SpCell switch request may be signaled through MAC-CE or UCI. In one configuration, these signaling may be relayed via the cooperative UE 706 on the sidelink and via the new cell 720 on the uplink 760.

Figure 10:
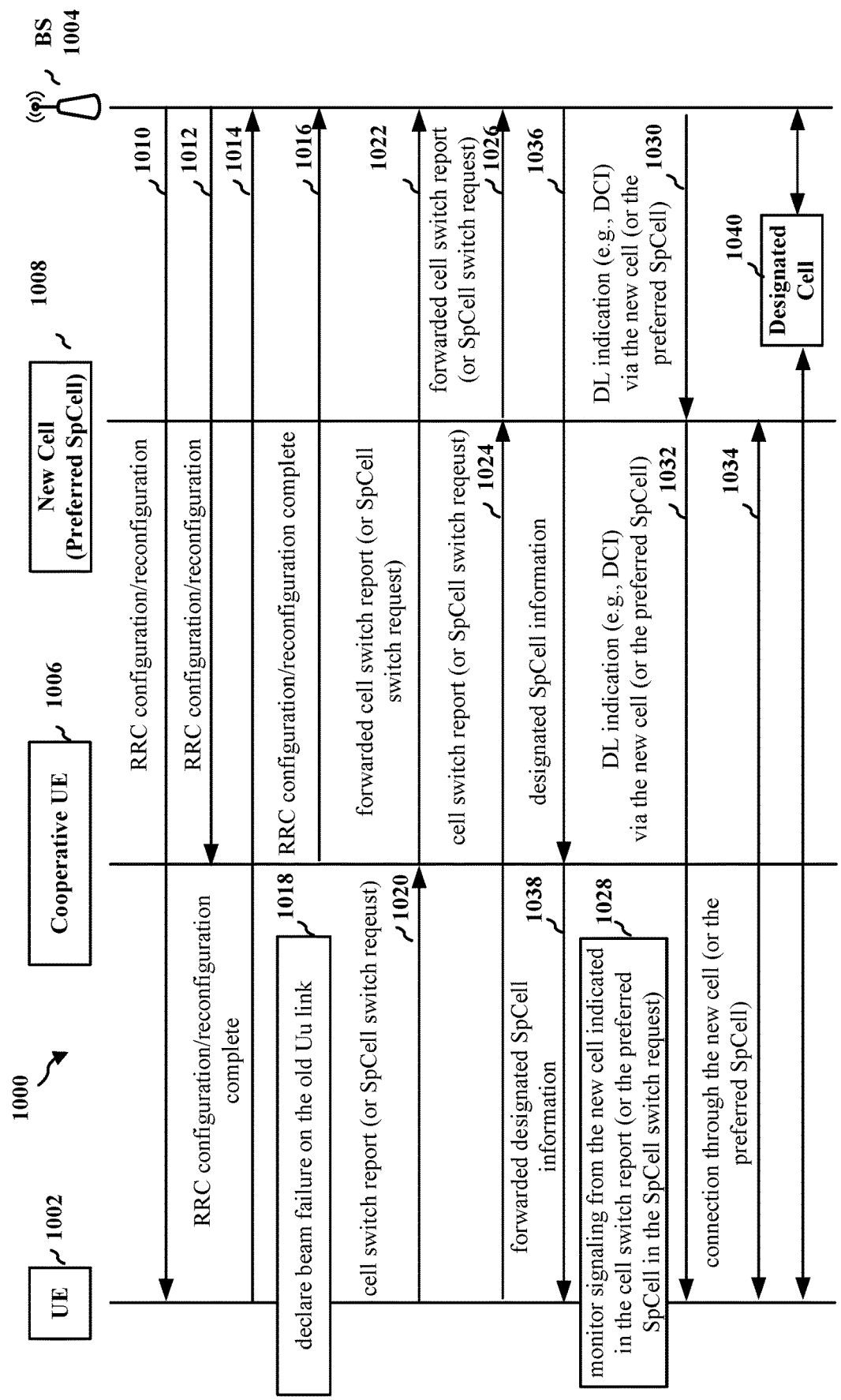
FIG. 10 is a call flow diagram illustrating a cell switch via a cooperative UE and a new cell in accordance with various aspects of this present disclosure.

FIG. 10 is a call flow diagram 1000 illustrating a cell switch via a cooperative UE and a new cell in accordance with various aspects of this present disclosure. Although aspects are described for a base station 1004, the aspects may be performed by a base station in aggregation and/or by one or more components of a base station 1004 (e.g., such as a CU 110, a DU 130, and/or an RU 140).

As shown in FIG. 10, the first several steps of the cell switch may be related to RRC configuration signaling and acknowledgement between the UE 1002, the cooperative UE 1006, and the base station 1004. These steps may include, for example, the base station 1004 transmitting RRC configuration (or reconfiguration) to the UE 1002 (at 1010) and the cooperative UE 1006 (at 1012), respectively, and receiving the confirmation of RRC configuration (or reconfiguration) complete from the UE 1002 (at 1014) and the cooperative UE 1006 (at 1016), respectively. The RRC configuration (or reconfiguration) may include configuration (or reconfiguration) for one or more of: sidelink resources, L1/L2 mobility cell set, SpCell switch/update options, and cell switch report options.

As shown in FIG. 10, in one configuration, when the UE 1002 declares, at 818, beam failure on the old Uu link (e.g., Uu link 740), the UE 1002 may send a cell switch report to the base station 1004 via the cooperative UE 1006 and via the new cell 808. That is, the UE 1002 may first send, at 1020, the cell switch report to the cooperative UE 1006, and the cooperative UE 1006 may forward, at 1022, the received cell switch report to the base station 1004. The UE 1002 may also send, at 1024, the cell switch report to the new cell 1008, and the new cell 1008 may forward, at 1026, the received cell switch report to the base station 1004. The cell switch report may indicate the new cell 808 the UE 1002 will switch to for communication with the base station 1004. The sidelink resources for the transmission between the UE 1002 and the cooperative UE 1006 may be preconfigured by the base station 1004. The cooperative UE 1006 may provide ACK to the UE 1002 regarding the cell switch report relaying status (e.g., an ACK indicating the cell switch report has been received by the cooperative UE 1006 or the cell switch report has been relayed to the base station 1004). After sending the cell switch report, the UE 1002 may start monitoring, at 1028, signaling from the new cell as indicated in the cell switch report. The cell switch may be considered successful when the UE 1002 receives, at 1032, a DL indication (e.g., DCI) via the new cell 1008 (i.e., the UE 1002 receives from the new cell 1008, at 1032, a forwarded DL indication the new cell 1008 receives, at 1030, from the base station 1004). Once the cell switch is completed, the UE 1002 may, at 1034, communicate with the base station 1004 through the new cell 1008.

As shown in FIG. 10, in another configuration, when the UE 1002 declares, at 1018, beam failure on the old Uu link (e.g., Uu link 740), the UE 1002 may send an SpCell switch request to the base station 1004 via the cooperative UE 1006 and via the new cell 1008. That is, the UE 1002 may first send, at 1020, an SpCell switch request to the cooperative UE 1006, and the cooperative UE 1006 may forward, at 1022, the received SpCell switch request to the base station 1004. The UE 1002 may also send, at 1024, the SpCell switch request to the new cell 1008, and the new cell 1008 may forward, at 1026, the received SpCell switch request to the base station 1004. The sidelink resources for the transmission between the UE 1002 and the cooperative UE 1006 may be preconfigured by the base station 1004. The cooperative UE 1006 may provide ACK to the UE 1002 regarding the SpCell switch request relaying status (e.g., an ACK indicating the SpCell switch request has been received by the cooperative UE 1006 or the SpCell switch request has been relayed to the base station 1004). After sending the SpCell switch request, the UE 1002 may start monitoring, at 1028, signaling from the preferred SpCell as indicated in the SpCell switch request. The cell switch may be considered successful when the UE 1002 receives, at 832, a DL indication (e.g., DCI) via the preferred SpCell. Once the cell switch is completed, the UE 1002 may, at 1034, communicate with the base station 1004 through the preferred SpCell (new cell 1008).

In some aspects, referring to FIG. 10, the base station 1004 may respond to the SpCell switch request with a designated SpCell 1040 for the UE 1002. In one configuration, if the UE 1002 does not indicate preferred new SpCell information in the SpCell switch request, the base station 1004 may respond with a designated SpCell 1040. In another configuration, if the UE 1002 indicates preferred new SpCell information in the SpCell switch request, the base station 1004 may respond with a designated SpCell 1040 that may be the same as or different from the preferred SpCell indicated in the SpCell switch request. The designated SpCell may be determined based on factors such as the quality of service (QoS) requirement of serving traffic, and the power/capacity/capability constraint of the source and relay UE. If the base station 1004 responds with a designated SpCell 1040, the base station 1004 may indicate a cell ID for the designated SpCell and the SpCell configuration to use if multiple configurations are available. The response of the base station 1004 may be sent through the cooperative UE 1006 or the new cell 1008 via MAC-CE or DCI. The cooperative UE 1006 or the new cell 1008 may forward the base station's response to the UE 1002. For example, as shown in FIG. 10, the base station 1004 may send, at 1036, the response that includes the designated SpCell information to the cooperative UE 1006, and the cooperative UE 1006 may forward, at 1038, the designated SpCell information to the UE 1002. After a preconfigured time, the UE 1002 and the base station 1004 may connect over the designated SpCell 1040.

Figure 11:
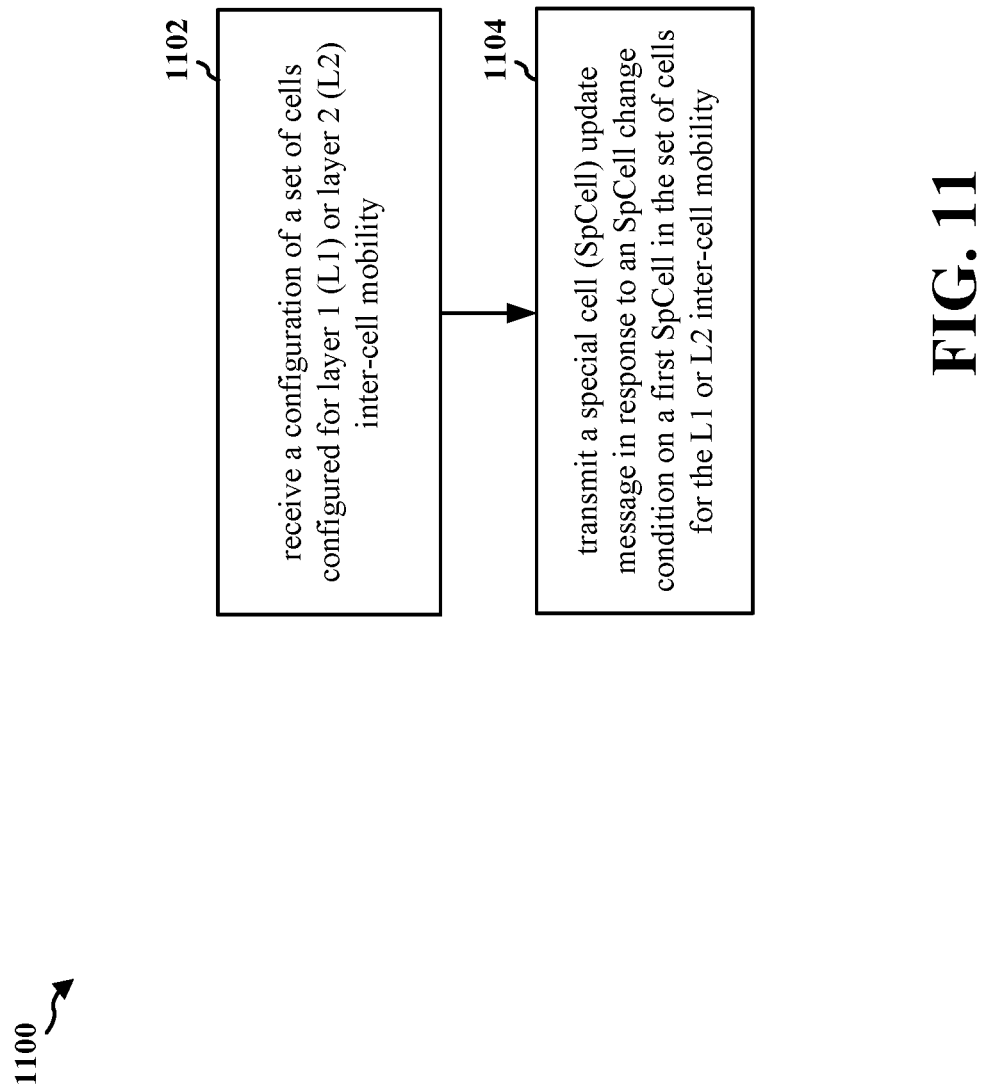
FIG. 11 is the first flowchart illustrating methods of wireless communication at a UE in accordance with various aspects of the present disclosure.

FIG. 11 is a flowchart 1100 illustrating methods of wireless communication at a first UE in accordance with various aspects of the present disclosure. The method may be performed by the first UE. The first UE may be the UE 104, 350, 702, 802, 902, 1002 or the apparatus 1704 in the hardware implementation of FIG. 17. The method improves the quality of service, beam reliability, and resource utilization of wireless communication, and reduces latency and power consumption of wireless communication.

As shown in FIG. 11, at 1102, the first UE may receive a configuration of a set of cells configured for L1 or L2 inter-cell mobility. The network entity may be a base station, or a component of a base station, in the access network of FIG. 1 or a core network component (e.g., base station 102, 310; base station 804, 904, 1004; or the network entity 1702 in the hardware implementation of FIG. 17). FIGS. 7, 8, 9, 10 illustrate various aspects of the steps in connection with flowchart 1100. For example, referring to FIG. 8, the first UE 802 may receive, at 808, a configuration (RRC configuration) of a set of cells configured for L1 or L2 inter-cell mobility. Referring to FIG. 9, the first UE 902 may receive, at 908, a configuration (RRC configuration) of a set of cells configured for L1 or L2 inter-cell mobility. Referring to FIG. 10, the first UE 1002 may receive, at 1010, a configuration (RRC configuration) of a set of cells configured for L1 or L2 inter-cell mobility.

At 1104, the first UE may transmit an SpCell update message in response to an SpCell change condition on a first SpCell in the set of cells for the L1 or L2 inter-cell mobility. For example, referring to FIG. 8, the first UE 802 may transmit, at 818, an SpCell update message (e.g., the cell switch report or the SpCell switch request) in response to an SpCell change condition on a first SpCell (e.g., beam failure on the old Uu link with the first SpCell) in the set of cells for the L1 or L2 inter-cell mobility. Referring to FIG. 9, the first UE 902 may transmit, at 914, an SpCell update message (e.g., the cell switch report or the SpCell switch request) in response to an SpCell change condition on a first SpCell (e.g., beam failure on the old Uu link with the first SpCell) in the set of cells for the L1 or L2 inter-cell mobility. Referring to FIG. 10, the first UE 1002 may transmit, at 1020, an SpCell update message (e.g., the cell switch report or the SpCell switch request) in response to an SpCell change condition on a first SpCell (e.g., beam failure on the old Uu link with the first SpCell) in the set of cells for the L1 or L2 inter-cell mobility.

Figure 12:
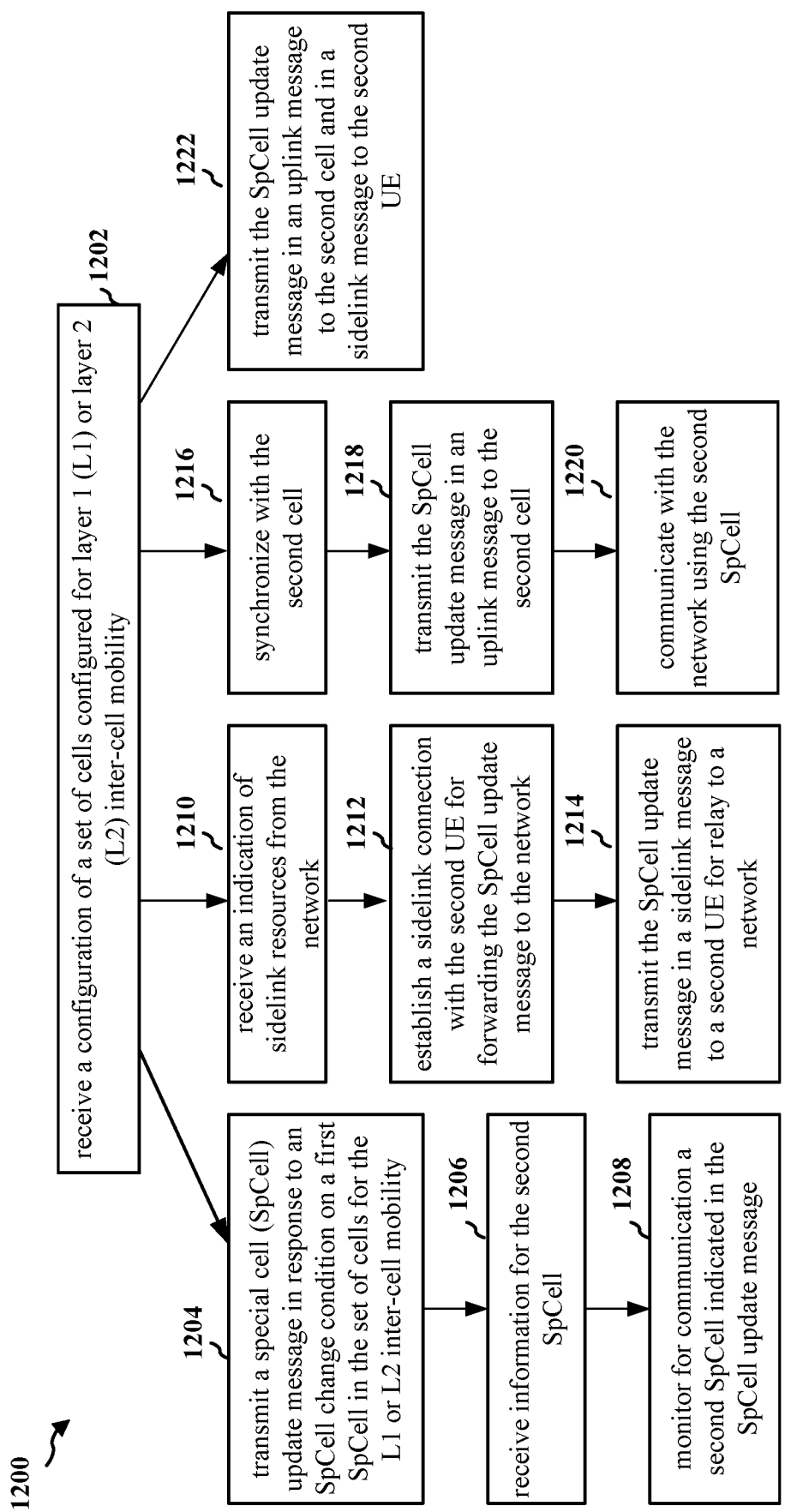
FIG. 12 is the second flowchart illustrating methods of wireless communication at a UE in accordance with various aspects of the present disclosure.

FIG. 12 is a flowchart 1200 illustrating methods of wireless communication at a first UE in accordance with various aspects of the present disclosure. The method may be performed by the first UE. The first UE may be the UE 104, 350, 702, 802, 902, 1002, or the apparatus 1704 in the hardware implementation of FIG. 17. The method improves the quality of service, beam reliability, and resource utilization of wireless communication, and reduces latency and power consumption of wireless communication.

As shown in FIG. 12, at 1202, the first UE may receive a configuration of a set of cells configured for L1 or L2 inter-cell mobility. The network entity may be a base station, or a component of a base station, in the access network of FIG. 1 or a core network component (e.g., base station 102, 310; base station 804, 904, 1004; or the network entity 1702 in the hardware implementation of FIG. 17). FIGS. 7, 8, 9, and 10 illustrate various aspects of the steps in connection with flowchart 1200. For example, referring to FIG. 8, the first UE 802 may receive, at 808, a configuration (RRC configuration) of a set of cells configured for L1 or L2 inter-cell mobility. Referring to FIG. 9, the first UE 902 may receive, at 908, a configuration (RRC configuration) of a set of cells configured for L1 or L2 inter-cell mobility. Referring to FIG. 10, the first UE 1002 may receive, at 1010, a configuration (RRC configuration) of a set of cells configured for L1 or L2 inter-cell mobility.

At 1204, the UE may transmit an SpCell update message in response to an SpCell change condition on a first SpCell in the set of cells for the L1 or L2 inter-cell mobility. For example, referring to FIG. 8, the first UE 802 may transmit, at 818, an SpCell update message (e.g., the cell switch report or the SpCell switch request) in response to an SpCell change condition on a first SpCell (e.g., beam failure on the old Uu link with the first SpCell) in the set of cells for the L1 or L2 inter-cell mobility. Referring to FIG. 9, the first UE 902 may transmit, at 914, an SpCell update message (e.g., the cell switch report or the SpCell switch request) in response to an SpCell change condition on a first SpCell (e.g., beam failure on the old Uu link with the first SpCell) in the set of cells for the L1 or L2 inter-cell mobility. Referring to FIG. 10, the first UE 1002 may transmit, at 1020, an SpCell update message (e.g., the cell switch report or the SpCell switch request) in response to an SpCell change condition on a first SpCell (e.g., beam failure on the old Uu link with the first SpCell) in the set of cells for the L1 or L2 inter-cell mobility.

In some aspects, the SpCell change condition may include a beam failure on the first SpCell. For example, referring to FIG. 8, the first UE 802 may declare beam failure at 816, and the SpCell change condition may include the beam failure on the first SpCell.

In some aspects, the SpCell update message may include a request to switch to a second SpCell. For example, referring to FIG. 8, the SpCell update message may include a request to switch to a second SpCell (e.g., the SpCell switch request).

At 1206, the first UE may receive, from a network entity, information for the second SpCell in response to the request. The information may indicate one or more of: a cell identifier (ID) for the second SpCell, or an SpCell configuration to use with the second SpCell. For example, referring to FIG. 8, the first UE 802 may receive, at 830, from a network entity (base station 804), information for the second SpCell (e.g., the designated SpCell information) in response to the request. Referring to FIG. 9, the first UE 902 may receive, at 930, from a network entity (base station 904), information for the second SpCell (e.g., the designated SpCell information) in response to the request. Referring to FIG. 10, the first UE 1002 may receive, at 1038, from a network entity (base station 804), information for the second SpCell (e.g., the designated SpCell information) in response to the request. In these examples, the information (e.g., the designated SpCell information) may indicate one or more of: a cell identifier (ID) for the second SpCell, or an SpCell configuration to use with the second SpCell.

In some aspects, the SpCell update message may include a cell switch indication indicating that the first UE will switch to a second SpCell. For example, referring to FIG. 8, the SpCell update message (e.g., the cell switch report at 818) may include a cell switch indication indicating that the first UE 802 will switch to a second SpCell. Referring to FIG. 9, the SpCell update message (e.g., the cell switch report at 914) may include a cell switch indication indicating that the first UE 902 will switch to a second SpCell.

At 1208, the first UE may monitor for communication on a second SpCell indicated in the SpCell update message. For example, referring to FIG. 8, the first UE 802 may monitor, at 822, for communication on the second SpCell indicated in the SpCell update message (e.g., signaling from the new cell indicated in the cell switch report). Referring to FIG. 10, the first UE 1002 may monitor, at 1028, for communication on the second SpCell indicated in the SpCell update message (e.g., signaling from the new cell indicated in the cell switch report).

In some aspects, the SpCell update message may include one or more of: an indication of a beam failure on a Uu link with the first SpCell, a channel condition measurement history for the Uu link with the first SpCell, an identification of a second SpCell, or a beam identifier. For example, referring to FIGS. 7 and 8, when the first UE 802 transmits, at 818, an SpCell update message (e.g., the cell switch report), the SpCell update message (e.g., the cell switch report) may include one or more of: an indication of a beam failure on a Uu link 740 with the first SpCell (710), a channel condition measurement history for the Uu link 740 with the first SpCell (710), an identification of a second SpCell (e.g., 720), or a beam identifier.

In some aspects, the SpCell update message may be included in at least one of a MAC-CE or UCI. For example, referring to FIG. 8, when the first UE 802 transmits, at 818, the SpCell update message (e.g., the cell switch report), the SpCell update message (e.g., the cell switch report) may be included in at least one of a MAC-CE or UCI.

At 1214, the first UE may transmit the SpCell update message in a sidelink message to a second UE for relay to a network. For example, referring to FIG. 8, the first UE 802 may transmit, at 818, the SpCell update message (e.g., the cell switch report) in a sidelink message to a second UE (cooperative UE 806) for relay to a network (base station 804).

At 1212, the first UE may establish, prior to transmission of the SpCell update message, a sidelink connection with the second UE for forwarding the SpCell update message to the network. For example, referring to FIG. 8, the first UE 802, may establish a sidelink connection with the second UE (cooperative UE 806) for forwarding the SpCell update message (e.g., cell switch report at 818) to the network (base station 804) prior to transmission of the SpCell update message (at 818).

At 1210, the first UE may receive an indication of sidelink resources from the network and transmit the SpCell update message to the second UE in the sidelink message using a sidelink resource indicated by the network. For example, referring to FIG. 8, the first UE 802 may receive, at 808, an indication of sidelink resources from the network (through RRC configuration/reconfiguration) and transmit, at 818, the SpCell update message (e.g., cell switch report) to the second UE (cooperative UE 806) in the sidelink message using a sidelink resource indicated by the network (base station 804).

At 1218, the first UE may transmit the SpCell update message in an uplink message to a second cell. For example, referring to FIG. 9, the first UE 902 may transmit, at 914, the SpCell update message (e.g., cell switch report) in an uplink message to a second cell (new cell 906).

At 1216, the first UE may synchronize with the second cell prior to the SpCell update message. For example, referring to FIG. 9, the first UE 902 may synchronize with the second cell (new cell 906) prior to transmitting the SpCell update message (e.g., cell switch report) at 914.

At 1220, the first UE may communicate with the network using the second SpCell. For example, referring to FIG. 9, the first UE 902 may communicate, at 924, with the network (base station 904) using the second SpCell (new cell 906).

In some aspects, the second cell may be a second SpCell indicated in the SpCell update message, and the first UE may communicate with a network using the second SpCell after the SpCell update message. For example, referring to FIG. 9, the second cell (new cell 906) may be a second SpCell indicated in the SpCell update message (cell switch report) the first UE 902 sends at 914, and the first UE 902 may, at 924, communicate with a network (base station 904) using the second SpCell (new cell 906) after the SpCell update message (e.g., the cell switch report).

In some aspects, the SpCell update message may indicate a second SpCell that is different than the second cell, and the first UE may communicate with a network using the second SpCell after the SpCell update message. For example, referring to FIG. 9, the SpCell update message (e.g., cell switch report) may indicate a second SpCell that is different than the second cell (new cell 906), and the first UE 902 may communicate with a network using the second SpCell after the SpCell update message (e.g., the cell switch report).

At 1222, the first UE may transmit the SpCell update message in: an uplink message to a second cell, and a sidelink message to a second UE. For example, referring to FIG. 10, the first UE 1002 may transmit the SpCell update message (e.g., cell switch report) in an uplink message to a second cell (at 1024, to a new cell 1008), and a sidelink message to a second UE (at 1020, to a cooperative UE 1006).

In some aspects, the SpCell update message may include at least one of: an activation request for a second SpCell, or a deactivation request for the first SpCell. For example, referring to FIGS. 7 and 8, the SpCell update message (cell switch report at 818) may include at least one of: an activation request for a second SpCell (e.g., Cell1 720), or a deactivation request for the first SpCell (710).

In some aspects, the activation request or the deactivation request may be based on at least one of: the power of the first UE, the capacity of the first UE, or the capability of the first UE. For example, referring to FIGS. 7 and 8, the activation request or the deactivation request may be based on at least one of: the power of the first UE 702, 802, the capacity of the first UE 702, 802, or the capability of the first UE 702, 802.

Figure 13:
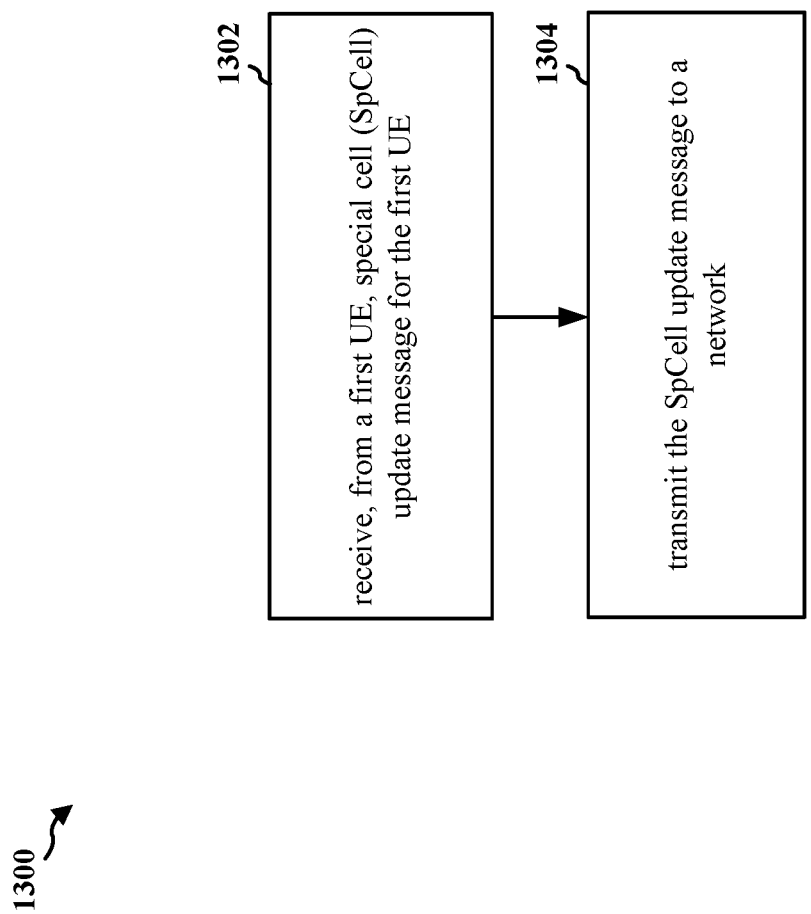
FIG. 13 is the third flowchart illustrating methods of wireless communication at a UE in accordance with various aspects of the present disclosure.

FIG. 13 is a flowchart 1300 illustrating methods of wireless communication at a second UE in accordance with various aspects of the present disclosure. The method may be performed by the second UE. The second UE may be the UE 706, 806, or 1006. The method improves the quality of service, beam reliability, and resource utilization of wireless communication, and reduces latency and power consumption of wireless communication.

As shown in FIG. 13, at 1302, the second UE may receive, from a first UE, an SpCell update message for the first UE. The first UE may be UE 702, 802, 902, or 1002. FIGS. 7, 8, and 10 illustrate various aspects of the steps in connection with flowchart 1300. For example, referring to FIGS. 7 and 8, the second UE 706, 806 may receive, at 818, from a first UE 702, 802, the SpCell update message (e.g., cell switch report) for the first UE 702, 802.

At 1304, the second UE may transmit the SpCell update message to a network. For example, referring to FIGS. 7 and 8, the second UE 706, 806 may transmit, at 820, the SpCell update message (e.g., cell switch report) to a network (base station 704, 804).

Figure 14:
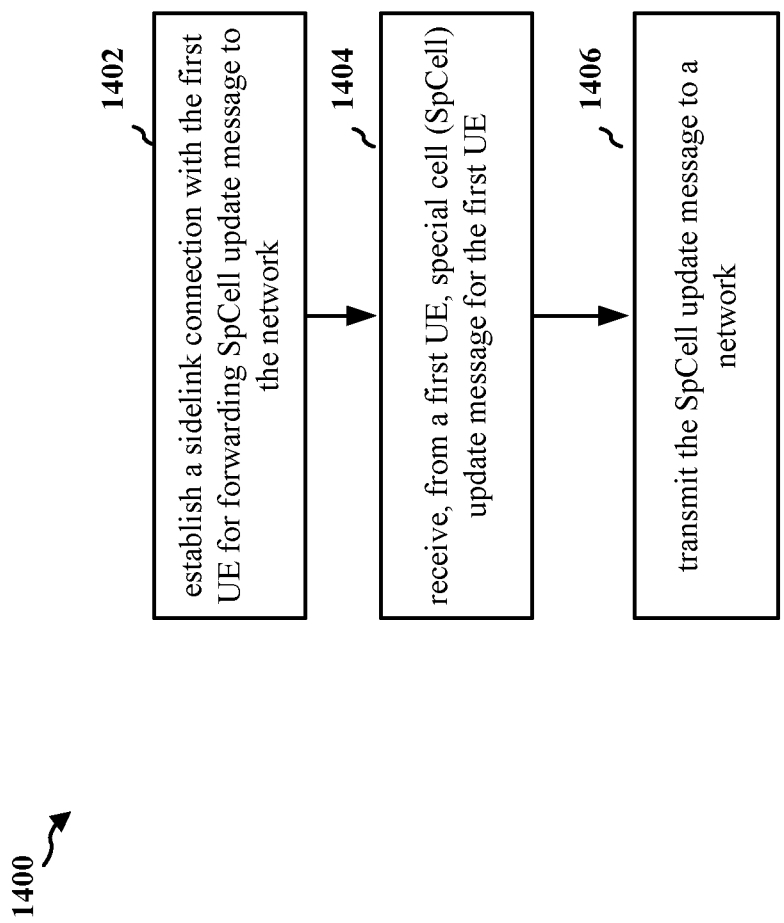
FIG. 14 is the fourth flowchart illustrating methods of wireless communication at a UE in accordance with various aspects of the present disclosure.

FIG. 14 is a flowchart 1400 illustrating methods of wireless communication at a second UE in accordance with various aspects of the present disclosure. The method may be performed by the second UE. The second UE may be the UE 706, 806, 1006. The method improves the quality of service, beam reliability, and resource utilization of wireless communication, and reduces latency and power consumption of wireless communication.

As shown in FIG. 14, at 1404, the second UE may receive, from a first UE, an SpCell update message for the first UE. The first UE may be UE 702, 802, 902, or 1002. FIGS. 7, 8, and 10 illustrate various aspects of the steps in connection with flowchart 1400. For example, referring to FIGS. 7 and 8, the second UE 706, 806, may receive, at 818, from a first UE 702, 802, the SpCell update message (e.g., cell switch report) for the first UE 702, 802.

At 1406, the second UE may transmit the SpCell update message to a network. For example, referring to FIGS. 7 and 8, the second UE 706, 806 may transmit, at 820, the SpCell update message (e.g., cell switch report) to a network (base station 704, 804).

In some aspects, the second UE may receive the SpCell update message from the first UE over sidelink based on a beam failure for a first Uu connection between the first UE and a first network entity, and the second UE may transmit the SpCell update message for the first UE over a second Uu connection to a second network entity of the network. For example, referring to FIGS. 7 and 8, the second UE 706, 806 may receive the SpCell update message (e.g., cell switch report, at 818) from the first UE 702, 802, over sidelink (750) based on a beam failure for a first Uu connection (Uu link 740) between the first UE 702, 802 and a first network entity (PCell/SpCell 710), and the second UE 706, 806 may transmit, at 820, the SpCell update message (e.g., cell switch report) for the first UE 702, 802 over a second Uu connection (770) to a second network entity (cell 730) of the network (base station 704, 804).

At 1402, the second UE may establish, prior to receiving the SpCell update message, a sidelink connection with the first UE for forwarding SpCell update messages to the network. For example, referring to FIG. 8, the second UE 806 may establish, prior to receiving the SpCell update message (e.g., receiving a cell switch report at 818), a sidelink connection with the first UE 802 for forwarding SpCell update messages (e.g., cell switch report) to the network (base station 804).

In some aspects, the SpCell update message may include one or more of: an indication of a beam failure on a Uu link between the first UE and the network, a channel condition measurement history for the Uu link between the first UE and the network, a request for an SpCell change for the first UE, an identification of an SpCell that the first UE will use, or a beam identifier for a beam that the first UE will use. For example, referring to FIGS. 7 and 8, the SpCell update message (e.g., cell switch report at 818) may include one or more of: an indication of a beam failure on a Uu link (e.g., Uu link 740) between the first UE 702, 802 and the network (base station 704, 804), a channel condition measurement history for the Uu link (e.g., Uu link 740) between the first UE 702, 802 and the network (base station 704, 804), a request for an SpCell change for the first UE 702, 802, an identification of an SpCell that the first UE will use, or a beam identifier for a beam that the first UE will use.

In some aspects, the SpCell update message may include the identification of the SpCell that the first UE will use from a set of cells configured for L1 or L2 inter-cell mobility. For example, referring to FIGS. 7 and 8, the SpCell update message (e.g., cell switch report at 818) may include the identification of the SpCell that the first UE 702, 802 will use from a set of cells configured for L1 or L2 inter-cell mobility.

In some aspects, the SpCell update message from the first UE may be included in at least one of a MAC-CE or UCI.

For example, referring to FIGS. 7 and 8, the SpCell update message (e.g., cell switch report at 818) from the first UE 702, 802 may be included in at least one of a MAC-CE or UCI.

In some aspects, the SpCell update message may include at least one of: an activation request for a second SpCell, or a deactivation request for the first SpCell. For example, referring to FIGS. 7 and 8, the SpCell update message (e.g., cell switch report at 818) may include at least one of: an activation request for a second SpCell (e.g., 720), or a deactivation request for the first SpCell (710).

Figure 15:
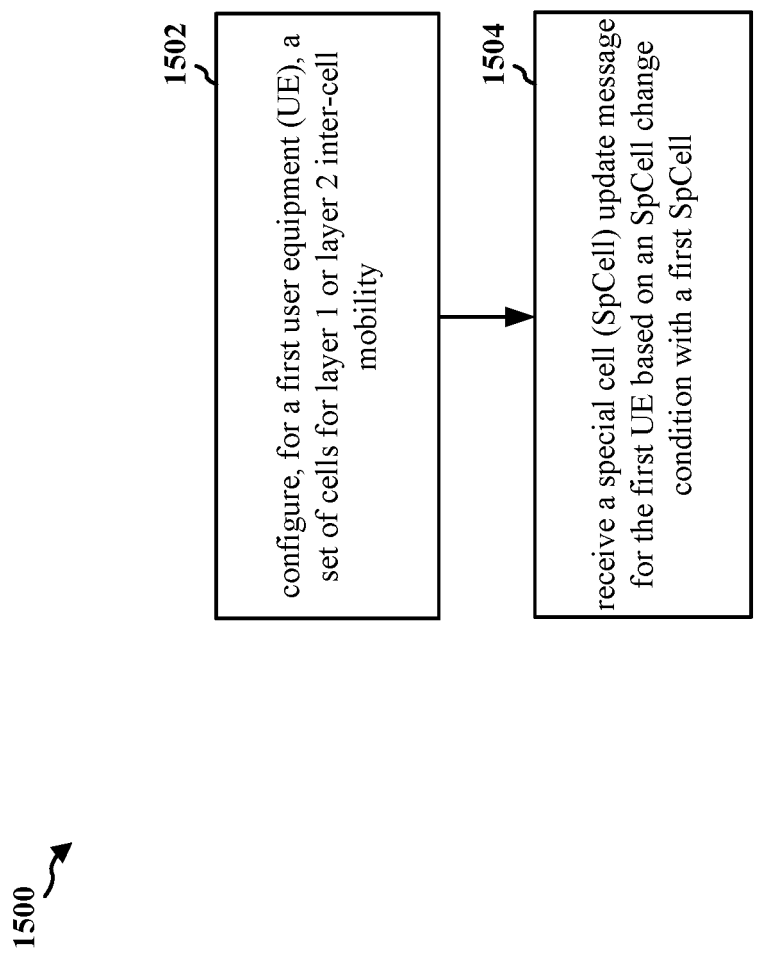
FIG. 15 is the first flowchart illustrating methods of wireless communication at a network entity in accordance with various aspects of the present disclosure.

FIG. 15 is a flowchart 1500 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 704, 804, 904, 1004; or the network entity 1702 in the hardware implementation of FIG. 17). The method improves the quality of service, beam reliability, and resource utilization of wireless communication, and reduces latency and power consumption of wireless communication.

As shown in FIG. 15, at 1502, the network entity may configure, for a first UE, a set of cells for L1 or L2 inter-cell mobility. The first UE may be the UE 104, 350, 702, 802, 902, 1002 or the apparatus 1704 in the hardware implementation of FIG. 17. FIGS. 7, 8, 9, and 10 illustrate various aspects of the steps in connection with flowchart 1500. For example, referring to FIG. 8, the network entity (base station 804) may configure, at 808, for a first UE 802, a set of cells for L1 or L2 inter-cell mobility (through RRC configuration/reconfiguration).

At 1504, the network entity may receive an SpCell update message for the first UE based on an SpCell change condition with a first SpCell. For example, referring to FIG. 8, the network entity (base station 804) may receive, at 820, an SpCell update message (e.g., cell switch report) for the first UE 802 based on an SpCell change condition with a first SpCell (e.g., beam failure on the old Uu link of the first UE 802).

Figure 16:
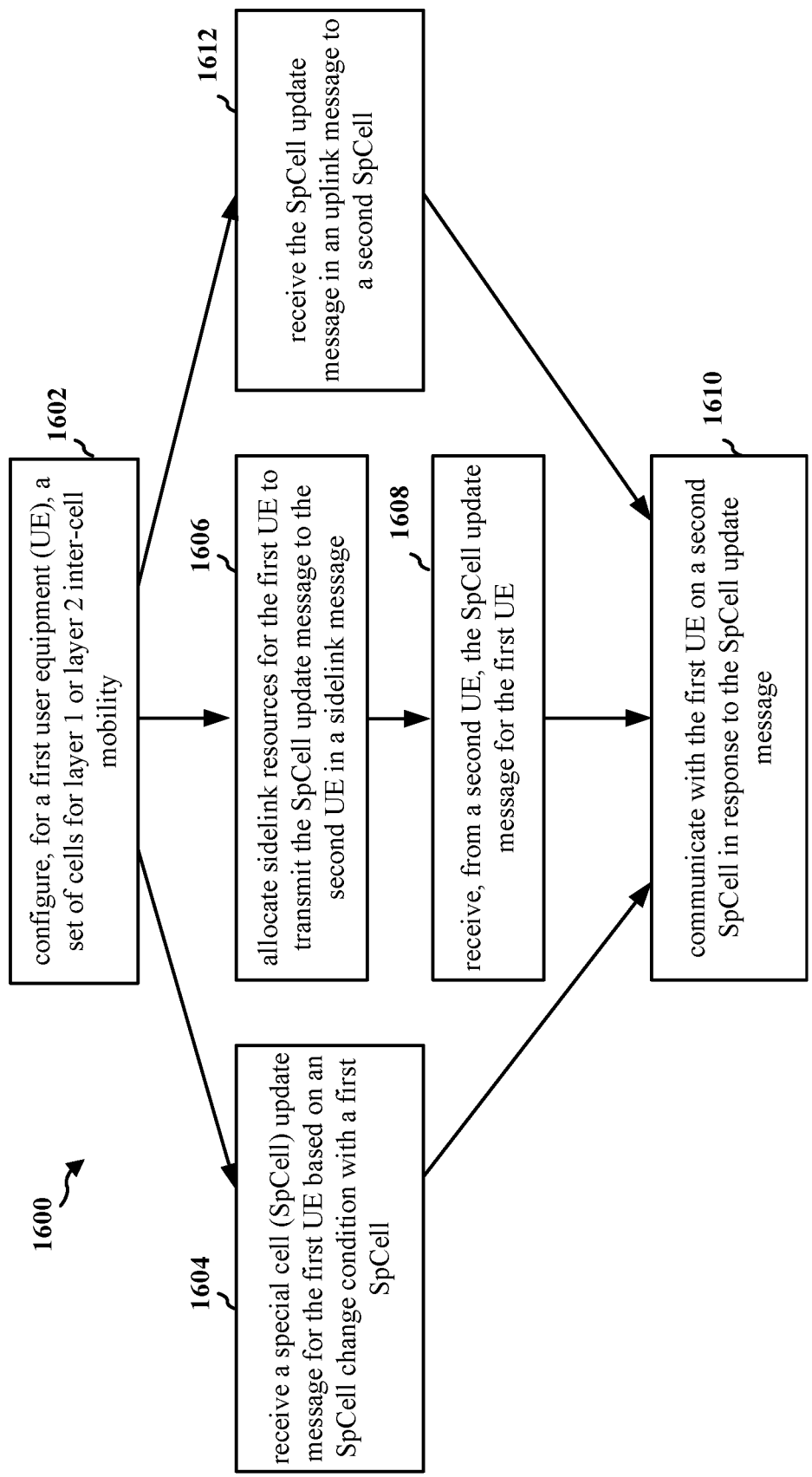
FIG. 16 is the second flowchart illustrating methods of wireless communication at a network entity in accordance with various aspects of the present disclosure.

FIG. 16 is a flowchart 1600 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 704, 804, 904, 1004; or the network entity 1702 in the hardware implementation of FIG. 17). The method improves the quality of service, beam reliability, and resource utilization of wireless communication, and reduces latency and power consumption of wireless communication.

As shown in FIG. 16, at 1602, the network entity may configure, for a first UE, a set of cells for L1 or L2 inter-cell mobility. The first UE may be the UE 104, 350, 702, 802, 902, 1002 or the apparatus 1704 in the hardware implementation of FIG. 17. FIGS. 7, 8, 9, and 10 illustrate various aspects of the steps in connection with flowchart 1600. For example, referring to FIG. 8, the network entity (base station 804) may configure, at 808, for a first UE 802, a set of cells for L1 or L2 inter-cell mobility (through RRC configuration/reconfiguration).

At 1604, the network entity may receive an SpCell update message for the first UE based on an SpCell change condition with a first SpCell. For example, referring to FIG. 8, the network entity (base station 804) may receive, at 820, an SpCell update message (e.g., cell switch report) for the first UE 802 based on an SpCell change condition with a first SpCell (e.g., beam failure on the old Uu link of the first UE 802).

At 1610, the network entity may communicate with the first UE on a second SpCell in response to the SpCell update message. For example, referring to FIGS. 7 and 8, the network entity (base station 704, 804) may communicate, at 826, with the first UE 702, 802 on a second SpCell (e.g., 720) in response to the SpCell update message (e.g., cell switch report at 818).

In some aspects, the SpCell update message may include one or more of: an indication of a beam failure on a Uu link with the first SpCell, a channel condition measurement history for the Uu link with the first SpCell, a request for an SpCell change, an identification of a second SpCell that the first UE will use, or a beam identifier. For example, referring to FIGS. 7 and 8, the SpCell update message (e.g., cell switch report at 818) may include one or more of: an indication of a beam failure on a Uu link 740 with the first SpCell (710), a channel condition measurement history for the Uu link 740 with the first SpCell (710), a request for an SpCell change (e.g., cell switch report), an identification of a second SpCell (e.g., 720) that the first UE will use, or a beam identifier.

In some aspects, the SpCell update message may be included in at least one of a MAC-CE or UCI. For example, referring to FIG. 8, the SpCell update message (e.g., cell switch report at 818) may be included in at least one of a MAC-CE or UCI.

At 1608, the network entity may receive, from a second UE, the SpCell update message for the first UE. For example, referring to FIGS. 7 and 8, the network entity (base station 704, 804) may receive, at 820, from a second UE (cooperative UE 706, 806), the SpCell update message (e.g., cell switch report) for the first UE 702, 802.

At 1606, the network entity may allocate sidelink resources for the first UE to transmit the SpCell update message to the second UE in a sidelink message. For example, referring to FIGS. 7 and 8, the network entity (base station 704, 804) may allocate sidelink resources for the first UE 702, 802 to transmit the SpCell update message (e.g., cell switch report) to the second UE (cooperative UE 706, 806) in a sidelink message.

At 1612, the network entity may receive the SpCell update message in an uplink message to a second SpCell. For example, referring to FIGS. 7 and 9, the network entity (base station 704, 904) may receive, at 916 the SpCell update message (e.g., cell switch report) in an uplink message (e.g., through uplink 760) to a second SpCell (e.g., 720).

In some aspects, the network entity may perform at least one of: activate forwarding of SpCell update messages for the first UE prior to the SpCell update message, deactivate the forwarding for the SpCell update messages after the SpCell update message, receive an activation request for the forwarding for the SpCell update messages, or receive a deactivation request for the forwarding for the SpCell update messages. For example, referring to FIGS. 7 and 8, the network entity (base station 704, 804) may perform at least one of: activate forwarding of SpCell update messages for the first UE 702, 802 prior to the SpCell update message, deactivate the forwarding for the SpCell update messages after the SpCell update message, receive an activation request for the forwarding for the SpCell update messages, or receive a deactivation request for the forwarding for the SpCell update messages.

Figure 17:
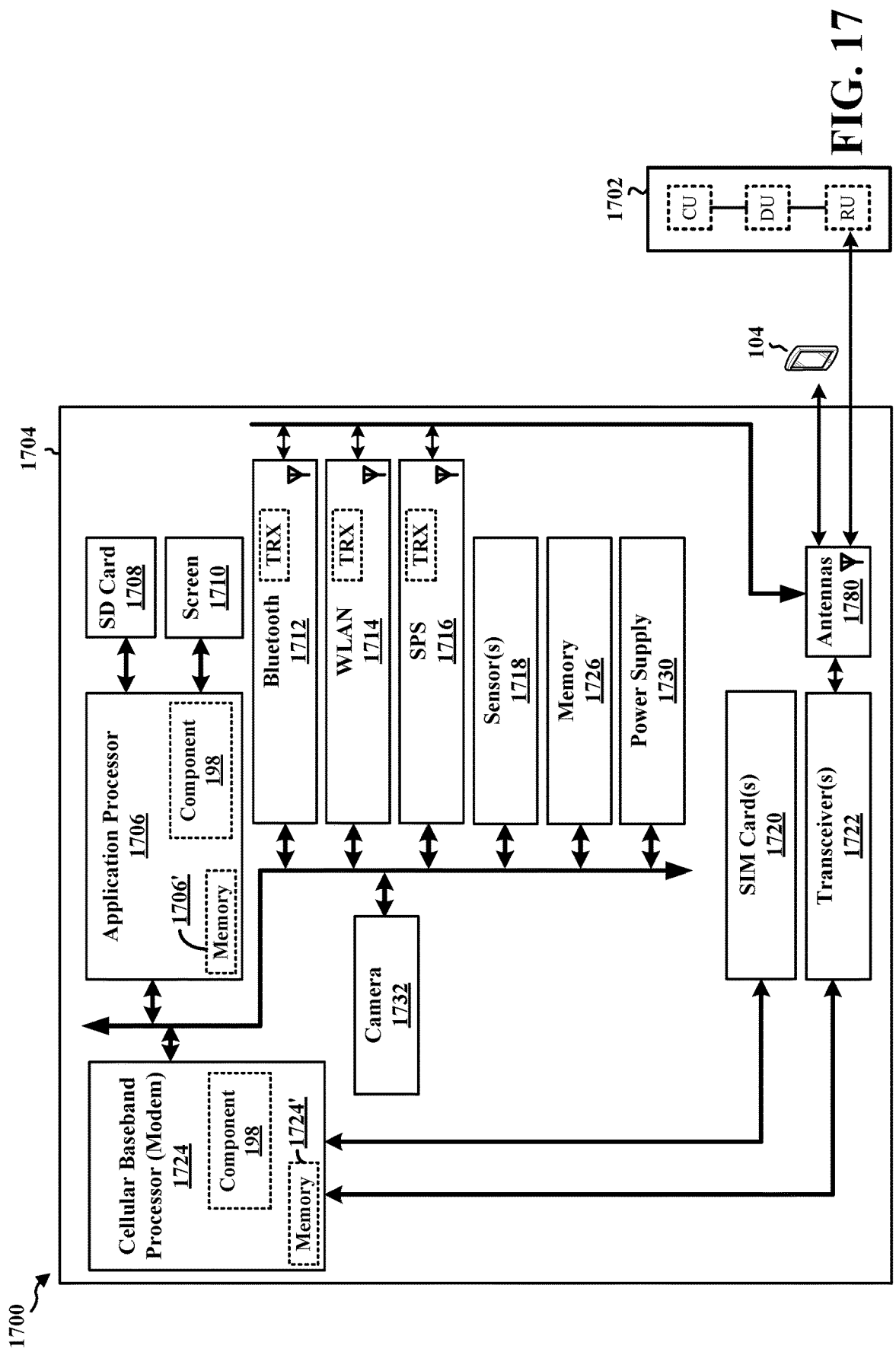
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see 350 of FIG. 3) and include the additional modules of the apparatus 1704.

As discussed supra, the component 198 is configured to receive a configuration of a set of cells configured for L1 or L2 inter-cell mobility; and transmit an SpCell update message in response to an SpCell change condition on a first SpCell in the set of cells for the L1 or L2 inter-cell mobility. The component 198 may be further configured to perform any of the aspects described in connection with the flowcharts in FIG. 11 and FIG. 12, and/or performed by the UE 802, 902, and 1002 in FIGS. 8, 9, and 10, respectively. The component 198 may be within the cellular baseband processor 1724, the application processor 1706, or both the cellular baseband processor 1724 and the application processor 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means for receiving a configuration of a set of cells configured for L1 or L2 inter-cell mobility and means for transmitting an SpCell update message in response to an SpCell change condition on a first SpCell in the set of cells for the L1 or L2 inter-cell mobility. The apparatus 1704 may further include means for performing any of the aspects described in connection with the flowcharts in FIG. 11 and FIG. 12, and/or aspects performed by the UE 802, 902, and 1002 in FIGS. 8, 9, and 10, respectively. The means may be the component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
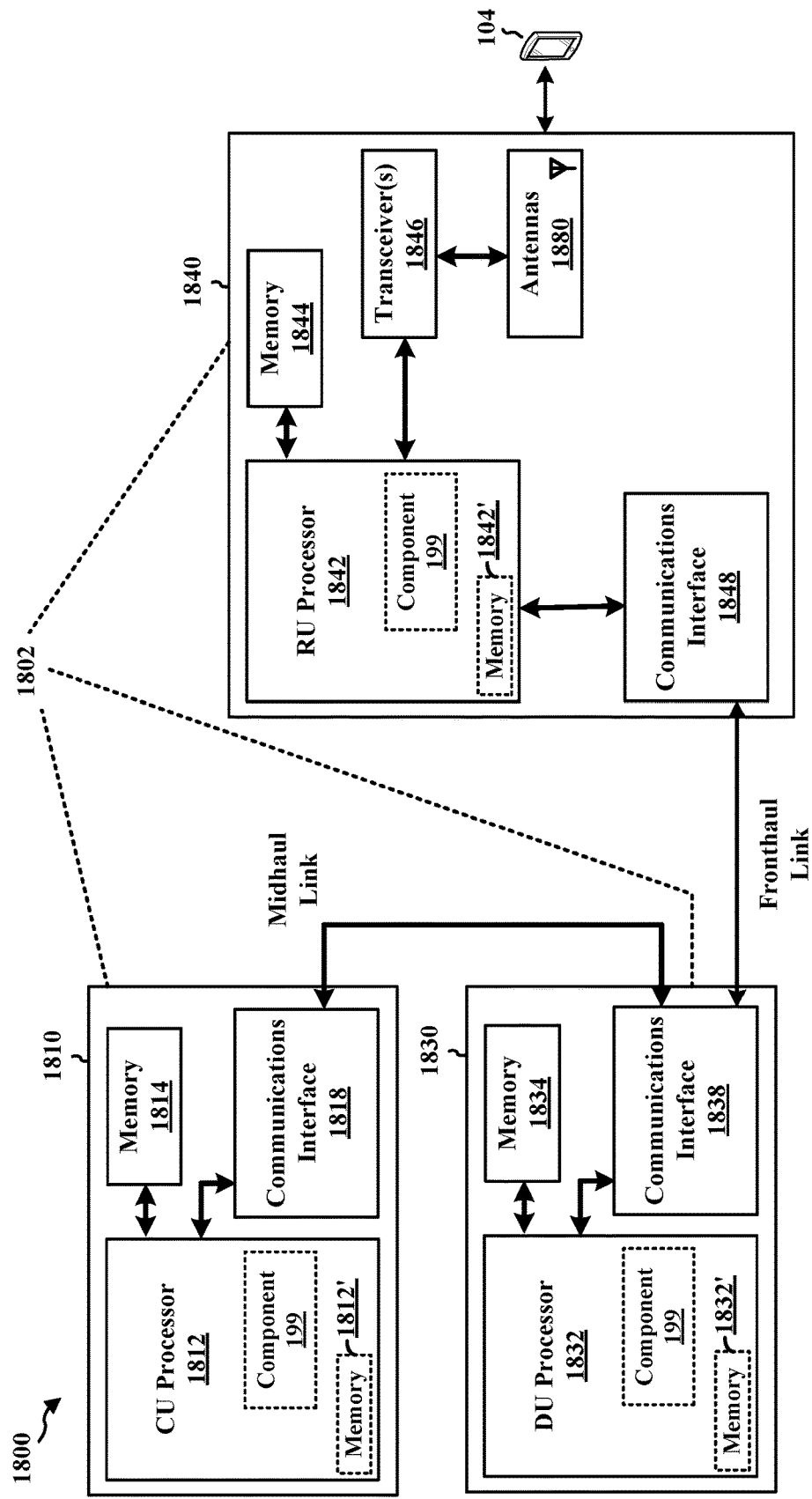
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra.

The computer-readable medium/memory may also be used for storing data that is manipulated by the processor(s) when executing software.

As discussed supra, the component 199 is configured to configure, for the first UE, a set of cells for L1 or L2 inter-cell mobility; and receive an SpCell update message for the first UE based on an SpCell change condition with a first SpCell. The component 199 may be further configured to perform any of the aspects described in connection with the flowcharts in FIG. 15 and FIG. 16, and/or performed by the base station 804, 904, and 1004 in FIGS. 8, 9, and 10, respectively. The component 199 may be within one or more processors of one or more of the CU 1810, DU 1830, and the RU 1840. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1802 may include a variety of components configured for various functions. In one configuration, the network entity 1802 includes means for configuring, for the first UE, a set of cells for L1 or L2 inter-cell mobility and means for receiving an SpCell update message for the first UE based on an SpCell change condition with a first SpCell. The network entity 1802 may further include means for performing any of the aspects described in connection with the flowcharts in FIG. 15 and FIG. 16, and/or aspects performed by the base station 804, 904, and 1004 in FIGS. 8, 9, and 10, respectively. The means may be the component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a first UE. The method may include the first UE receiving a configuration of a set of cells configured for L1 or L2 inter-cell mobility; and transmitting an SpCell update message in response to an SpCell change condition on a first SpCell in the set of cells for the L1 or L2 inter-cell mobility. The method improves the quality of service, beam reliability, and resource utilization of wireless communication, and reduces latency and power consumption of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first UE. The method includes the first UE receiving a configuration of a set of cells configured for L1 or L2 inter-cell mobility; and transmitting an SpCell update message in response to an SpCell change condition on the first SpCell in the set of cells for the L1 or L2 inter-cell mobility.

Aspect 2 is the method of aspect 1, where the SpCell change condition includes a beam failure on the first SpCell.

Aspect 3 is the method of aspect 1, where the SpCell update message includes a request to switch to the second SpCell.

Aspect 4 is the method of aspect 3, where the method further includes: receiving, from a network entity, information for the second SpCell in response to the request. The information may indicate one or more of: a cell identifier (ID) for the second SpCell, or an SpCell configuration to use with the second SpCell.

Aspect 5 is the method of aspect 1, where the SpCell update message includes a cell switch indication indicating that the first UE will switch to the second SpCell.

Aspect 6 is the method of aspect 1, where the method further includes monitoring for communication on the second SpCell indicated in the SpCell update message.

Aspect 7 is the method of any of aspects 1 to 6, where the SpCell update message includes one or more of: an indication of a beam failure on a Uu link with the first SpCell, a channel condition measurement history for the Uu link with the first SpCell, an identification of a second SpCell, or a beam identifier.

Aspect 8 is the method of any of aspects 1 to 7, where the SpCell update message is included in at least one of a MAC-CE or UCI.

Aspect 9 is the method of any of aspects 1 to 8, where the method further includes transmitting the SpCell update message in a sidelink message to the second UE for relay to a network.

Aspect 10 is the method of aspect 9, where the method further includes: establishing, prior to transmission of the SpCell update message, a sidelink connection with the first UE for forwarding the SpCell update message to the network.

Aspect 11 is the method of aspect 9, where the method further includes: receiving an indication of sidelink resources from the network and transmit the SpCell update message to the second UE in the sidelink message using a sidelink resource indicated by the network.

Aspect 12 is the method of any of aspects 1 to 11, where the method further includes transmitting the SpCell update message in an uplink message to the second cell.

Aspect 13 is the method of aspect 12, where the method further includes: synchronizing with the second cell prior to transmitting the SpCell update message.

Aspect 14 is the method of aspect 12, where the second cell is the second SpCell indicated in the SpCell update message, and the method further includes: communicating with a network using the second SpCell after the SpCell update message.

Aspect 15 is the method of aspect 12, where the SpCell update message indicates a second SpCell that is different than the second cell, and the method further includes: communicating with a network using the second SpCell after the SpCell update message.

Aspect 16 is the method of any of aspects 1 to 15, where the first UE is configured to transmit the SpCell update message in: an uplink message to a second cell, and a sidelink message to a second UE.

Aspect 17 is the method of any of aspects 1 to 16, where the SpCell update message includes at least one of: an activation request for a second SpCell, or a deactivation request for the first SpCell.

Aspect 18 is the method of aspect 17, where the activation request or the deactivation request is based on at least one of: the power of the first UE, the capacity of the first UE, or the capability of the first UE.

Aspect 19 is an apparatus for wireless communication at a first UE, including: a memory; and at least one processor coupled to the memory and, based at least in part on information stored in the memory, the at least one processor is configured to perform the method of any of aspects 1-18.

Aspect 20 is the apparatus of aspect 19, further including at least one of a transceiver or an antenna coupled to the at least one processor and configured to receive the configuration of the set of cells and to transmit the SpCell update message.

Aspect 21 is an apparatus for wireless communication including means for implementing the method of any of aspects 1-18.

Aspect 22 is a computer-readable medium (e.g., a non-transitory computer-readable medium) storing computer-executable code, where the code when executed by a processor causes the processor to implement the method of any of aspects 1-18.

Aspect 23 is a method of wireless communication at a second UE. The method includes the second UE receiving, from the first UE, an SpCell update message for the first UE; and transmitting the SpCell update message to a network.

Aspect 24 is the method of aspect 23, where the second UE is configured to receive the SpCell update message from the first UE over sidelink based on a beam failure for a first Uu connection between the first UE and a first network entity, and the second UE transmits the SpCell update message for the first UE over a second Uu connection to a second network entity of the network.

Aspect 25 is the method of aspect 23, where the method further includes: establishing, prior to receiving the SpCell update message, a sidelink connection with the first UE for forwarding SpCell update messages to the network.

Aspect 26 is the method of aspect 23, where the SpCell update message includes one or more of: an indication of a beam failure on a Uu link between the first UE and the network, a channel condition measurement history for the Uu link between the first UE and the network, a request for an SpCell change for the first UE, an identification of an SpCell that the first UE will use, or a beam identifier for a beam that the first UE will use.

Aspect 27 is the method of aspect 26, where the SpCell update message includes the identification of the SpCell that the first UE will use from a set of cells configured for L1 or L2 inter-cell mobility.

Aspect 28 is the method of aspect 23, where the SpCell update message from the first UE is included in at least one of a MAC-CE or uplink control information.

Aspect 29 is the method of aspect 23, where the SpCell update message includes at least one of: an activation request for a second SpCell, or a deactivation request for the first SpCell.

Aspect 30 is an apparatus for wireless communication at a second UE, including: a memory; and at least one processor coupled to the memory and, based at least in part on information stored in the memory, the at least one processor is configured to perform the method of any of aspects 23-29.

Aspect 31 is the apparatus of aspect 30, further including at least one of a transceiver or an antenna coupled to the at least one processor and configured to receive the SpCell update message for the first UE and to transmit the SpCell update message to the network.

Aspect 32 is an apparatus for wireless communication including means for implementing the method of any of aspects 23-29.

Aspect 33 is a computer-readable medium (e.g., a non-transitory computer-readable medium) storing computer-executable code, where the code when executed by a processor causes the processor to implement the method of any of aspects 23-29.

Aspect 34 is a method of wireless communication at a network entity. The method includes the network entity configuring, for a first UE, a set of cells for L1 or L2 inter-cell mobility; and receiving an SpCell update message for the first UE based on an SpCell change condition with the first SpCell.

Aspect 35 is the method of aspect 34, where the method further includes: communicating with the first UE on a second SpCell in response to the SpCell update message.

Aspect 36 is the method of aspect 34, where the SpCell update message includes one or more of: an indication of a beam failure on a Uu link with the first SpCell, a channel condition measurement history for the Uu link with the first SpCell, a request for an SpCell change, an identification of a second SpCell that the first UE will use, or a beam identifier.

Aspect 37 is the method of aspect 34, where the SpCell update message is included in at least one of a MAC-CE or UCI.

Aspect 38 is the method of aspect 34, where the method further includes receiving, from a second UE, the SpCell update message for the first UE.

Aspect 39 is the method of aspect 38, where the method further includes: allocating sidelink resources for the first UE to transmit the SpCell update message to the second UE in a sidelink message.

Aspect 40 is the method of aspect 38, where the method further includes receiving the SpCell update message in an uplink message to a second SpCell.

Aspect 41 is the method of aspect 34, where the method further includes at least one of: activating forwarding of SpCell update messages for the first UE prior to the SpCell update message, deactivating the forwarding for the SpCell update messages after the SpCell update message, receiving an activation request for the forwarding for the SpCell update messages, or receiving a deactivation request for the forwarding for the SpCell update messages.

Aspect 42 is an apparatus for wireless communication at a network entity, including: a memory; and at least one processor coupled to the memory and, based at least in part on information stored in the memory, the at least one processor is configured to perform the method of any of aspects 34-41.

Aspect 43 is the apparatus of aspect 42, further including at least one of a transceiver or an antenna coupled to the at least one processor and configured to receive the SpCell update message for the first UE.

Aspect 44 is an apparatus for wireless communication including means for implementing the method of any of aspects 34-41.

Aspect 45 is a computer-readable medium (e.g., a non-transitory computer-readable medium) storing computer-executable code, where the code when executed by a processor causes the processor to implement the method of any of aspects 34-41.

What is claimed is:

1. An apparatus for wireless communication at a first user equipment (UE), comprising:
    a memory; and
    at least one processor coupled to the memory and, based at least in part on stored information stored in the memory, the at least one processor is configured to:
        receive a configuration of a set of cells configured for layer 1 (L1) or layer 2 (L2) inter-cell mobility; and
        transmit a special cell (SpCell) update message in response to an SpCell change condition on a first SpCell in the set of cells for the L1 or L2 inter-cell mobility, wherein a transmission of the SpCell update message is via one of:
            a sidelink message to a second UE via a sidelink connection between the first UE and the second UE, or
            an uplink message to a second cell in the set of cells, wherein the second cell is indicated in the SpCell update message.

2. The apparatus of claim 1, wherein the apparatus further comprises a transceiver coupled to the at least one processor and is configured to receive the configuration of the set of cells and to transmit the SpCell update message, and wherein the SpCell change condition comprises a beam failure on the first SpCell.

3. The apparatus of claim 1, wherein the SpCell update message comprises one or more of:
    a request to switch to a second SpCell; and
    a cell switch indication indicating that the first UE will switch to the second SpCell.

4. The apparatus of claim 3, wherein the at least one processor is further configured to:
    receive, from a network entity, information for the second SpCell in response to the request, the information indicating one or more of:
        a cell identifier (ID) for the second SpCell, or
        an SpCell configuration to use with the second SpCell.

5. The apparatus of claim 1, wherein the at least one processor is further configured to:
    monitor for communication on a second SpCell indicated in the SpCell update message.

6. The apparatus of claim 1, wherein the SpCell update message includes one or more of:
    an indication of a beam failure on a Uu link with the first SpCell,
    a channel condition measurement history for the Uu link with the first SpCell,
    an identification of a second SpCell, or
    a beam identifier.

7. The apparatus of claim 1, wherein the SpCell update message is comprised in at least one of a medium access control-control element (MAC-CE) or uplink control information (UCI).

8. The apparatus of claim 1, wherein the at least one processor is configured to transmit the SpCell update message in the sidelink message to the second UE for relay to a network.

9. The apparatus of claim 8, wherein the at least one processor is further configured to:
    establish, prior to the transmission of the SpCell update message, the sidelink connection with the second UE for forwarding the SpCell update message to the network.

10. The apparatus of claim 8, wherein the at least one processor is further configured to:
    receive an indication of sidelink resources from the network and transmit the SpCell update message to the second UE in the sidelink message using a sidelink resource indicated by the network.

11. The apparatus of claim 1, wherein the at least one processor is configured to transmit the SpCell update message in the uplink message to the second cell.

12. The apparatus of claim 11, wherein the at least one processor is further configured to:
    synchronize with the second cell prior to transmitting the SpCell update message.

13. The apparatus of claim 11, wherein the second cell is a second SpCell indicated in the SpCell update message, wherein the at least one processor is further configured to:

communicate with a network using the second SpCell after the SpCell update message.

14. The apparatus of claim 11, wherein the SpCell update message indicates a second SpCell that is different than the second cell, wherein the at least one processor is further configured to:
communicate with a network using the second SpCell after the SpCell update message.

15. The apparatus of claim 1, wherein the at least one processor is configured to transmit the SpCell update message in:
the uplink message to the second cell, and
the sidelink message to the second UE.

16. The apparatus of claim 1, wherein the SpCell update message comprises at least one of:
an activation request for a second SpCell, or
a deactivation request for the first SpCell.

17. The apparatus of claim 16, wherein the activation request or the deactivation request is based on at least one of:
a power of the first UE,
a capacity of the first UE, or
a capability of the first UE.

18. An apparatus for wireless communication at a second user equipment (UE), comprising:
a memory; and
at least one processor coupled to the memory and, based at least in part on stored information stored in the memory, the at least one processor is configured to:
receive, from a first UE, a special cell (SpCell) update message for the first UE, wherein a transmission of the SpCell update message is via a sidelink message from the first UE via a sidelink connection between the first UE and the second UE, wherein the SpCell update message indicates an SpCell change of the first UE from a first SpCell to a second SpCell; and
transmit the SpCell update message to a network.

19. The apparatus of claim 18, wherein the apparatus further comprises a transceiver coupled to the at least one processor and is configured to receive the SpCell update message and to transmit the SpCell update message,
and wherein the at least one processor is configured to receive the SpCell update message from the first UE over sidelink based on a beam failure for a first Uu connection between the first UE and a first network entity, and the at least one processor transmits the SpCell update message for the first UE over a second Uu connection to a second network entity of the network.

20. The apparatus of claim 18, wherein the at least one processor is further configured to:
establish, prior to receiving the SpCell update message, the sidelink connection with the first UE for forwarding SpCell update messages to the network.

21. The apparatus of claim 18, wherein the SpCell update message includes one or more of:
an indication of a beam failure on a Uu link between the first UE and the network,
a channel condition measurement history for the Uu link between the first UE and the network,
a request for the SpCell change for the first UE,
an identification of an SpCell that the first UE will use, or
a beam identifier for a beam that the first UE will use.

22. The apparatus of claim 18, wherein the SpCell update message comprises at least one of:
an activation request for the second SpCell, or
a deactivation request for the first SpCell.

23. An apparatus for wireless communication at a network entity, comprising:
a memory; and
at least one processor coupled to the memory and, based at least in part on stored information stored in the memory, the at least one processor is configured to:
configure, for a first user equipment (UE), a set of cells for layer 1 (L1) or layer 2 (L2) inter-cell mobility; and
receive a special cell (SpCell) update message for the first UE based on an SpCell change condition with a first SpCell, wherein a reception of the SpCell update message is from one of:
a second UE via a sidelink connection between the first UE and the second UE, or
an uplink message to a second SpCell in the set of cells from the first UE, wherein the second SpCell is indicated in the SpCell update message.

24. The apparatus of claim 23, wherein the apparatus further comprises a transceiver coupled to the at least one processor and is configured to receive the SpCell update message,
and wherein the at least one processor is further configured to:
communicate with the first UE on the second SpCell in response to the SpCell update message.

25. The apparatus of claim 23, wherein the SpCell update message includes one or more of:
an indication of a beam failure on a Uu link with the first SpCell,
a channel condition measurement history for the Uu link with the first SpCell,
a request for an SpCell change,
an identification of the second SpCell that the first UE will use, or
a beam identifier.

26. The apparatus of claim 23, wherein the at least one processor is configured to receive, from the second UE, the SpCell update message for the first UE.

27. The apparatus of claim 26, wherein the at least one processor is further configured to:
allocate sidelink resources for the first UE to transmit the SpCell update message to the second UE in a sidelink message.

28. The apparatus of claim 26, wherein the at least one processor is configured to receive the SpCell update message in the uplink message to the second SpCell.

29. The apparatus of claim 23, wherein the at least one processor is further configured to perform at least one of:
activate forwarding of SpCell update messages for the first UE prior to the SpCell update message,
deactivate the forwarding for the SpCell update messages after the SpCell update message,
receive an activation request for the forwarding for the SpCell update messages, or
receive a deactivation request for the forwarding for the SpCell update messages.

30. A method of wireless communication at a first user equipment (UE), comprising:
receiving a configuration of a set of cells configured for layer 1 (L1) or layer 2 (L2) inter-cell mobility; and
transmitting a special cell (SpCell) update message in response to an SpCell change condition on a first SpCell in the set of cells for the L1 or L2 inter-cell mobility, wherein a transmission of the SpCell update message is via one of:

a sidelink message to a second UE via a sidelink connection between the first UE and the second UE, or an uplink message to a second cell in the set of cells, wherein the second cell is indicated in the SpCell update message.

\* \* \* \* \*